US006834675B1

(12) United States Patent
Gill

(10) Patent No.: US 6,834,675 B1
(45) Date of Patent: Dec. 28, 2004

(54) INTEGRATED MULTIPURPOSE CAGED VALVE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 10/636,106

(22) Filed: Aug. 6, 2003

(51) Int. Cl.[7] .................................................. F16K 7/12
(52) U.S. Cl. .................................. 137/625.32; 251/287
(58) Field of Search ..................... 137/625.32; 251/287

(56) References Cited

U.S. PATENT DOCUMENTS 5,387,017 A * 2/1995 Gill ............................. 285/322
5,402,867 A * 4/1995 Nakadate et al. ........... 188/299
5,868,441 A * 2/1999 Gill ............................. 285/322
5,950,664 A * 9/1999 Battaglia ..................... 137/375
6,651,697 B2 * 11/2003 Gonsior .................. 137/625.32

* cited by examiner

Primary Examiner—John Fox

(57) ABSTRACT

An integrated multipurpose valve is a valve in which more than one type of valves are integrated in a cage held permanently in the pipeline, and the valve as a while can perform multiple functions which allow it to be a shut off valve, a pressure reducing valve, a pressure relief valve and a check valve, and a multi-diversion valve which can divert fluid flow in several directions. The inner components of the valve can be inspected and replaced without removing the valve as a whole from the line.

20 Claims, 17 Drawing Sheets

SECTION 1-1

SECTION 3-3

SECTION 2-2

SECTION 4-4

SECTION 5-5

US 6,834,675 B1

INTEGRATED MULTIPURPOSE CAGED VALVE

BACKGROUND

1. Field of the Invention

The invention is in the field of flow control and pressure reducing valves, check valves, gates and shutoff valves to control fluid flow in piping systems.

2. State of the Art

Currently, most valves are produced as single units, with each valve designed to perform a limited and specific function. A pressure reducing valve, however, can perform more than one function, but still it is a single valve. The pressure reducing valve requires two auxiliary valves; one at the inlet and other at the outlet to isolate it from the fluid when any internal part needs to be changed. When shut off valves, like butterfly valves or a ball valves, require maintenance, they are taken out of the line entirely. The same is true for many other types of valves. Valves which are used to control corrosive fluids require frequent maintenance. In the case of fixed flanged valves, it becomes difficult and time consuming to remove the valve from the line and to put it back. The influence of variable pressure and temperature conditions, coupled with the movement of the pipe itself when the valve is pulled out of the line, can bring about a change in the space which the valve occupied before its removal. Thus, for a flanged valve it becomes very problematic when one finds that space has been lost or gained for the valve, when an attempt is made to re-install the valve in its original place. Where valves are required to be taken out of the line frequently to change their seals, the difficulty becomes even more acute. To overcome this difficulty, GROVE VALVES REGULATORS AND FLOW CONTROL SYSTEMS supplies a sleeve valve in a cage which is removable from the cage. The cage is made of cross bolts holding the opposite two flanges of the cage together, which are attached to the ends of two pipes. Half of the cross bolts of the cage are removed before the entire valve body is removed from the cage. Then, the elastomeric sleeve is freed from the valve and the metallic sleeve, so that it can be replaced with a new elastomeric sleeve. Like any other valve, GROVE VALVES also require two extra shutoff valves at the inlet and at the outlet sides of the valve. Large size valves are heavy, and removing them from the pipe line requires special equipment. It is much easier to take the light-weight component out of the cage than to take the whole valve unit out.

To mitigate surges and water hammers in the pipe line, shutoff valves are operated at very slow speed. In city water lines, valves of 8 inch size and larger take quite a bit of the operator's time. In larger size valves, usually two men are sent to turn off the shutoff valve, because it takes time and energy to turn them off. When the water line breaks, and two people go out to shut off the valve, their travel time plus twenty minutes to turn off the valve, poses a serious problem. By that time serious economic losses do result. In such situations, a valve which can be turned off quickly, in the shortest possible time has great economic merit. The invented integrated multipurpose caged valve, which has a wider range of applications and economic merit, is a compact valve, having features that allows it to be a shutoff valve, to isolate its own inner replaceable components, which are valves themselves. Said inner replaceable valves can be pressure reducing valves or pressure relief valves or check valves or auxiliary shut of valves. To achieve all that is described above; i.e. the economic advantages, the compactness, the ease of valve maintenance and operation, and the speed by which a shutoff valve can be operated on, the new invention consolidates valves as components in a single valve unit by integrating them in a cage. Said cage is kept permanently in the pipe line by means of connectors such as pipe flanges tied together with bolts and nuts, or pipe couplings. The cage can alternatively be kept permanently in line by welding the two ends of the cage to the two opposite pipes in the pipe line.

From here on, major valve components will be designated by "degree", where each degree is a step in the order of the component's assemblage in the valve unit. The minor components, i.e. any actuators, needle valves, control pilot valves, or secondary seals, are not assigned any degree under this classification. The integration of all of the components constitutes the entire valve body. Here after, the entire valve body will be referred to as "valve".

The first degree component is the cage itself, and it is installed permanently in the pipe line by connecting its two opposite piped ends to the ends of the two pipes being connected. The cage also has a inner cavity to receive other major components of the valve. From here on the cage will be referred to as "cage" only, and the inner cavity will be referred to as winner cavity" or "inner cavity of the cage".

The second degree component is a primary seal (including at least two tieing sealing bolts), which is an elastomeric pipe (or tube) tubular seal, and it has two opposite openings and is situated between two matching openings, one in the inner cavity of the cage, and an other opening in the wall of cylindrical shut off valve. From here the elastomeric pipe tube seal will be referred to as the "primary seal" or tubular seal.

The third degree component is a rotatable cylindrical shut off valve, which has at least two openings that match and correspond to said two openings of the elastomeric tube seal. The shut off valve also provides a preferably flat seat or two opposite flat seats concentric to its axis for an elastomeric diaphragm or two opposite diaphragms resembling the shape of a big hat. Here after, the cylindrical valve will be referred as the "shut off valve".

The fourth degree component is an elastomeric diaphragm (or diaphragms), for the diaphragm valve, which resembles a big hat. The elastomeric diaphragm functions as a pressure reducing valve, a pressure relief valve, and a check valve. Hereafter, the elastomeric diaphragm will be referred as the "diaphragm". In the fourth degree component are also included piston valves, which can be pressure reducing and shut off valves.

The fifth degree component is a valve drive which has a shaft to rotate the third degree component, which is the cylindrical shutoff valve.

A sixth degree component constitutes one or two cover plates which are held to the valve by means of bolts or by means of camming jaws, which are invented by the inventor under U.S. Pat. Nos. 5,387,017 and 5,868,441 to close the inner cavity of the cage which accommodates the inner components from the second degree to the fifth degree. As explained above, the valve will mostly be described by the terms: valve, cage, inner cavity, primary (tubular) seal, shut off valve, diaphragm or diaphragms, piston or pistons, valve drive, and cover plate or cover plates.

SUMMARY OF THE INVENTION

According to the invention, the Integrated Multipurpose Caged Valve has a valve body which includes a cage for enclosure, to hold in place, and to enclose, separable integrated valve components. The centrally located inner cavity in the cage constitutes a circular tubular cavity designed to receive and to hold in place, major components of the second degree to the fifth degree. On opposite sides, the cage has two pipe pieces extending concentric to its longitudinal horizontal axis. Said two pipe pieces are provided with connecting means in their end portions which are used to connect the two ends of two opposite pipes. The means to connect the cage to the pipes can be flanges, grooves or threads, or rotatable camming jaws couplings invented by the inventor under the above cited U.S. patent Ser. Nos. 5,387,017 and 5,868,441.

The valve, from its components, can be assembled in the shop or at the site. The valve can be manufactured by casting, machining, fabricating or any combination of the above. The valve can be manufactured from different types of metals or plastics or from any combination of both materials.

The inner cavity of the cage opens at least on its one end to receive major valve components of second to fifth degrees. The inner cavity can be open ended on both of its ends. Thus, either one or two cover plates are provided to close the inner cavity, depending on whether one or two ends of the inner cavity are open. The axis of the shut off valve and the elastomeric diaphragm or diaphragms which the shut off valve accommodates, coincide with the vertical axis of the inner cavity of the cage, and a common plane of these coincided axes intersect vertically with the longitudinal horizontal axis of the cage, thus dividing the valve into two equal symmetrical sections.

The inner cavity of the cage has two opposite openings concentric to its longitudinal horizontal axis. These openings are enclosed and encircled by two said opposite pieces of pipes of the cage.

As mentioned above the inner cavity of the cage is provided with a cover plate or plates which are held in place to the cage by means of bolts. The covers can also be held in place by means of rotatable camming jaws invented by the inventor under above cited U.S. patent Ser. Nos. 5,387,017 and 5,868,441.

The cylindrical shut off valve, along with the hat shaped elastomeric diaphragm or diaphragms, is rotatable inside the inner cavity of the cage. The inner space of the cylindrical shut off valve between two elastomeric diaphragms is vertically partitioned into two equal halves by means of a partitioning plate or partitioning pipe. In the first case, this plate is made integral with the cylindrical wall of the shut off valve. In the second case, said inner space is partitioned by a pipe integrally held in place by means of two running flanges, with one flange on one side of said pipe and the other flange on the opposite side of said pipe (which flanges may be constructed as left over sections of the said partitioning plate after removing a central portion of said plate to fit the diameter of said pipe, with said pipe welded to said flanges) where said flanges are integrally connected to the cylindrical wall of, and to the two seats of, the shut off valve. It is pointed out here that instead of a circular pipe opening, any other openings of different geometry, such as, square, rectangular or oval are equally contemplated. In the first case the cylindrical wall of the shutoff valve is provided with two opposite openings which match, in size, with the two opposite openings of the cage and with the two opposite openings of the primary seal. In the second case four openings are provided in said wall, where two openings are provided by the inlet and outlet openings of the partitioning pipe. These four openings are located circumferentially at 90 degrees apart. When the shut of valve is provided with one or two elastomeric diaphragms, then the valve can function as a pressure reducing and check valve simultaneously, or as a shut off valve and pressure relief valve simultaneously. If the diaphragm or diaphragms of the shut off valve need replacement then the shut off valve can be rotated 90 degrees to block the fluid from entering the shut off valve while allowing fluid flow through the partitioning pipe, and therefore still allowing fluid flow through the pipe line. It is clear that when two valves are put in series, the diaphragms of either shut of valve can be changed, and the flow can be maintained through the pipe line, and it is also clear that no bypass will be needed. This elimination of the need for a bypass results in the elimination of the requirement for the extra space that parallel bypass configurations require.

Means, such as wedge bearings, roller bearings, ball bearings, or bolt bearings are provided to keep the shut-off valve rotatably locked inside the inner cavity of the cage, and means are also provided to limit and restrict the rotation of the shut off valve beyond a certain point. Wedge and bolt bearings will be explained under the description of the drawings. It is pointed out here that in certain applications said bearings may not be needed.

The cylindrical shut off valve with a diaphragm or diaphragms, can also be modified to accommodate a piston, or two opposite pistons, by providing a second concentric cylinder within its inner cylindrical space. The shut off valve and the said second concentric cylinder are connected by means of a reducing pipe. Said second concentric cylinder can be cast integrally with the shut off valve and with the seats provided by the shut off valve for the diaphragms, or it can be fabricated by welding a cylinder after excavating said seats. Each piston is axially moveable between the seat and the flat cover plate, and each said piston is connected to its corresponding said seat by means of barbs or stems of bolts, with a loose slidable fit, which seat is an integral part of the cylindrical valve. Said two opposite pistons are mounted on a common shaft. By means of said shaft the shut off valve can be rotated to close or to open multiple openings in the body of the cage. Thus, the invented shut off valve in a cage, also can accommodate piston valves to control fluid as pressure reducing valves, and the shut of valve can close or open fluid flow to multiple openings in the body of the cage.

It is an object of the invention to provide a cage for the shut off valve, wherein said shut off valve can accommodate more than one type of valves.

It is an object of the invention to provide a cage for the shut off valve from which a diaphragm or diaphragms, or a piston or pistons, can be removed for replacement.

It is an other object of this invention to provide a valve which has its own integrated shut off valve to block the fluid flow from the inlet pipe and the outlet pipe, simultaneously, to either diaphragm or piston valve or valves, thus eliminating the need of external gates and reducers between the inlet and outlet pipes and the valve.

It is an other object of the invention to provide a valve with enhanced volummetric fluid capacity.

It is an other object of the valve that, by removing the cover plate, the old diaphragm (or the old piston) can be replaced with the new diaphragm (or the new piston) while the shut off valve keeps the fluid blocked.

It is an other object of the invention, that when the invented valve employs a pipe partitioning means (shown in FIG. 5), and when two such valves are installed in series adjacent to each other in the pipe line, then during the process of replacing a diaphragm or diaphragms in one of said two valves, the fluid flow can be regulated and kept uninterrupted, by the second of said two valves, thus eliminating the need of bypass.

It is an other object of this invention that the diaphragm valve can function as a pressure reducing or a pressure relief valve.

It is an other object of this invention that the diaphragm valve functions as a shut-off valve, and simultaneously acts as a pressure relief valve to damp out any surge creating water hammer. The surge is relieved not by removing liquid from the line, but by keeping the fluid in the pipe line, thus requiring no outer place to which the liquid is disposed off, as is the current conventional approach.

It is an other object of the invention to reduce the economic cost of the valves when they are integrated in a single valve unit. Use of the same cage for different valves helps to achieve economy of scale.

It is an other object of the invention to provide a very quite valve by damping the sound frequencies with the primary elastomeric seal and the elastomeric diaphragms.

It is an other object of the invention to provide a cage for the valve, where its two opposite ends can be connected by means of connectors, or welded, to the ends of the inlet and outlet pipes respectively, so that the cage can remain permanently in the pipe line.

It is an other object of the invention to provide a valve, which does not need reducers to be connected to the inlet and outlet pipes.

It is an other object of the invention to provide a valve, where only a single needle valve and a single pilot control valve could be enough to control flow control means, which flow control means are elastomeric diaphragms or pistons

THE DRAWINGS

In the accompanying drawings, which illustrate the best mode presently contemplated for carrying out the invention:

DETAILED DESCRIPTION OF THE ILLUSTRATED EMBODIMENT

Figure 1:
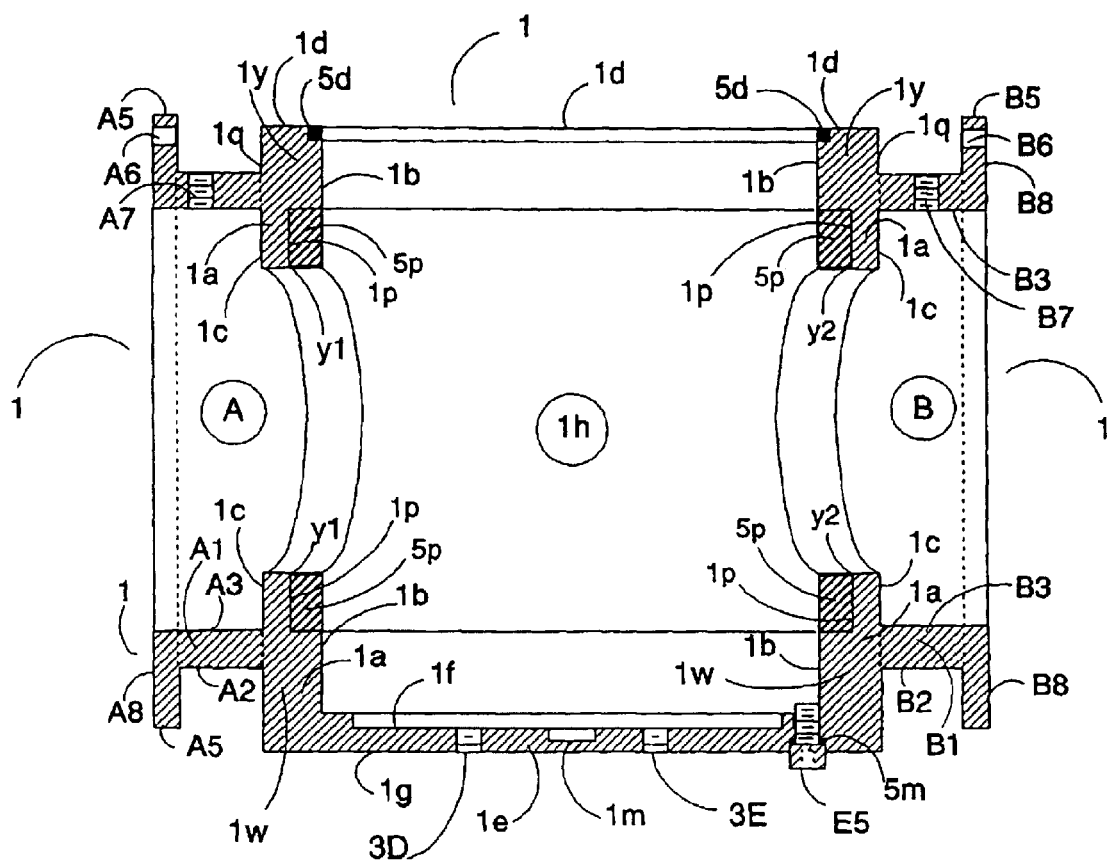
FIG. 1, is an axial vertical section of the cage, where said cage is the first degree component, and where the inner cylindrical cavity of the cage is provided with one opening on top, and it also shows a primary seal.

Because of the geometric symmetry and certain commonalty of all the figures, all drawings can be studied together. With the exception of the hat shaped opposite two diaphragms 4; and the two opposite flat circular seats 2E and E1 for the diaphragms 4; and the opposite pistons C26 and C31 in FIG. 14; and the two opposite flat circular covers 3, and the circular flanges A8 and B8, most other elements are cylindrical in geometry. Because of the same geometry for the opposite elements, the same numbers and letters are used to identify them. If one side is described, then, simultaneously, the other is described. The lettering of the drawings are systematized in the following order:

First. The first degree component is the cage 1 in FIGS. 1 and 2 for the valve, and it is assigned lower case numeral 1 subscripted by lower case letters. The inlet and outlet pipe portions of the cage are lettered in upper casing A and B respectively, subscripted by numerals.

Second. The second degree component is a primary seal 1p shown in FIGS. 1 and 2, and all other seal are assigned numeral 5 subscripted by letters.

Third. The third degree component is the cylindrical shut off valve and it is assigned numeral 2 (shown in FIG. 3) and subscripted by upper case letters.

Fourth. The hat shaped diaphragm and its surroundings are assigned upper casing numeral 4 (shown in FIG. 3) subscripted by letters.

Fifth. Valve drives are assigned upper casing C (shown in FIG. 3) subscripted by numerals; and lower case letters.

Sixth. The valve cover for the cage is assigned numeral 3 (shown in FIG. 3) subscripted by letters.

Seventh. Inside of the shut off valve, a plate or two parallel plates, providing seats for the elastomeric diaphragm, are assigned letter E (shown in FIG. 3) subscripted by numerals.

Some discrepancy from the above arrangement will be noted. Drawings are not to any particular scale.

What will not be explained here with FIG. 1 and FIG. 2, will be explained along with other FIGS.

FIG. 1 shows cage 1 having inner cylindrical cavity 1h contained by the cylindrical wall 1a. The inner cavity 1h has receiving opening 1d, which is encircled by seal 5d. The inner face 1b of wall 1a is provided with a cylindrical groove 1p. A pipe tubular gasket seal 5p is shown mounted in groove 1p. The inner portion of cylindrical cavity 1h lies below the inner diameters of pipes A1 and B1. The cylindrical cavity 1h is provided with two opposite openings y1 and y2. Additionally, the space of the inner cavity 1h is enlarged by the space of inlet chamber A and outlet chamber B. Said chambers A and B are provided by the enclosure of the inlet piece of pipe A1 and outlet piece of pipe B3, which pieces of pipes extend from the cylindrical wall 1a. Two flanges to attach the cage to the inlet and outlet pipes of the pipe line are shown by AS and $B_8$, where said inlet and outlet pipes are not shown. The outer face of wall 1a is shown by 1c. The outer and inner diameters of pipe A1 are shown by A2 and A3. The outer and inner diameters of pipe B1 are shown by B2 and B3. The openings for bolts to tie flanges to the flanges of inlet and outlet pipes are shown by A6 and B6 respectively. Outer portions of wall 1a are indicated by 1y and 1w and their outer cylindrical surface is shown by 1q. The integral dead end plate of cavity 1h is depicted by 1e.

Figure 2:
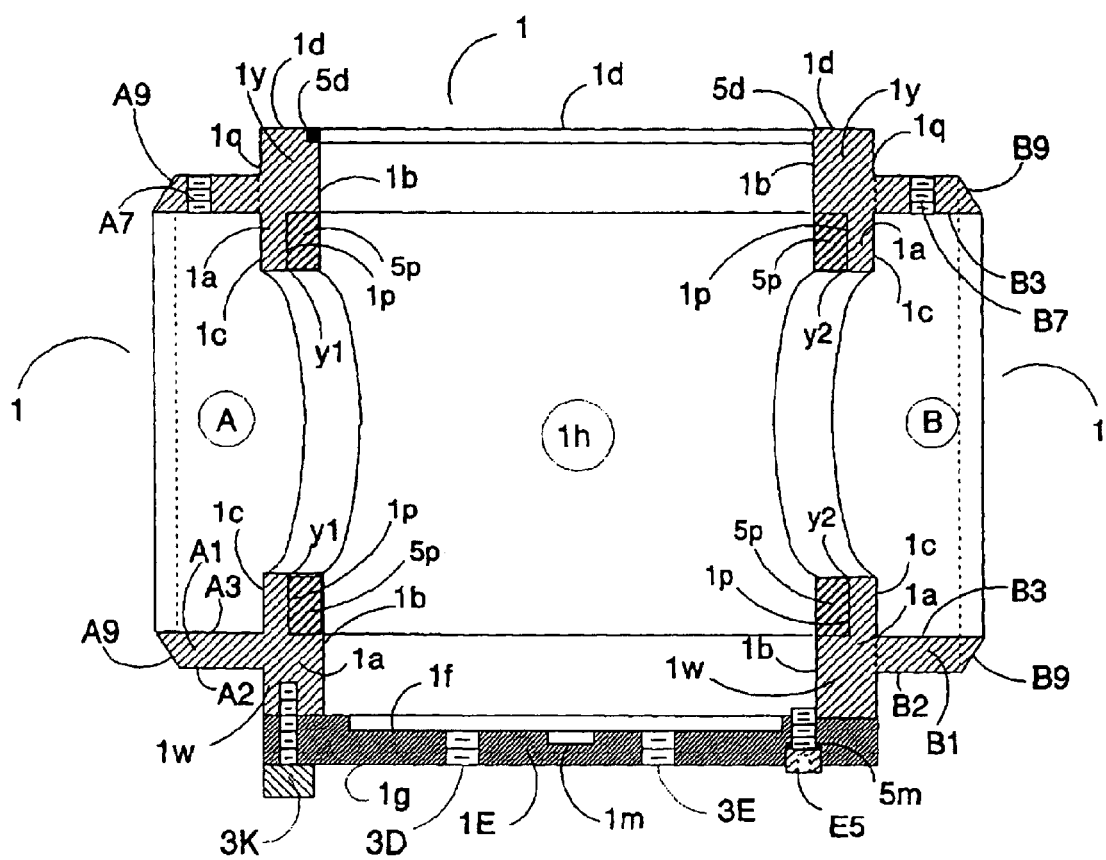
FIG. 2, is an axial vertical section of the cage, where said cage is the first degree component, and where the inner cylindrical cavity of the cage is provided with two openings; one on top and one on bottom.

FIG. 2 is the same as FIG. 1 except that cavity 1h opens on both ends. Instead of one cover plate as in FIG. 1, two cover plates will be needed to cover the end openings of cavity 1h. The bottom cover plate is shown by 1E. Instead of flanges A8 and A9 of FIG. 1, FIG. 2 shows beveled ends A8 and B9, which are welded to the inlet and outlet pipes. Instead of flanges or bevel ends as described above, the cage can be attached to inlet and outlet pipes by means of threaded couplings or any groove coupling.

Figure 3:
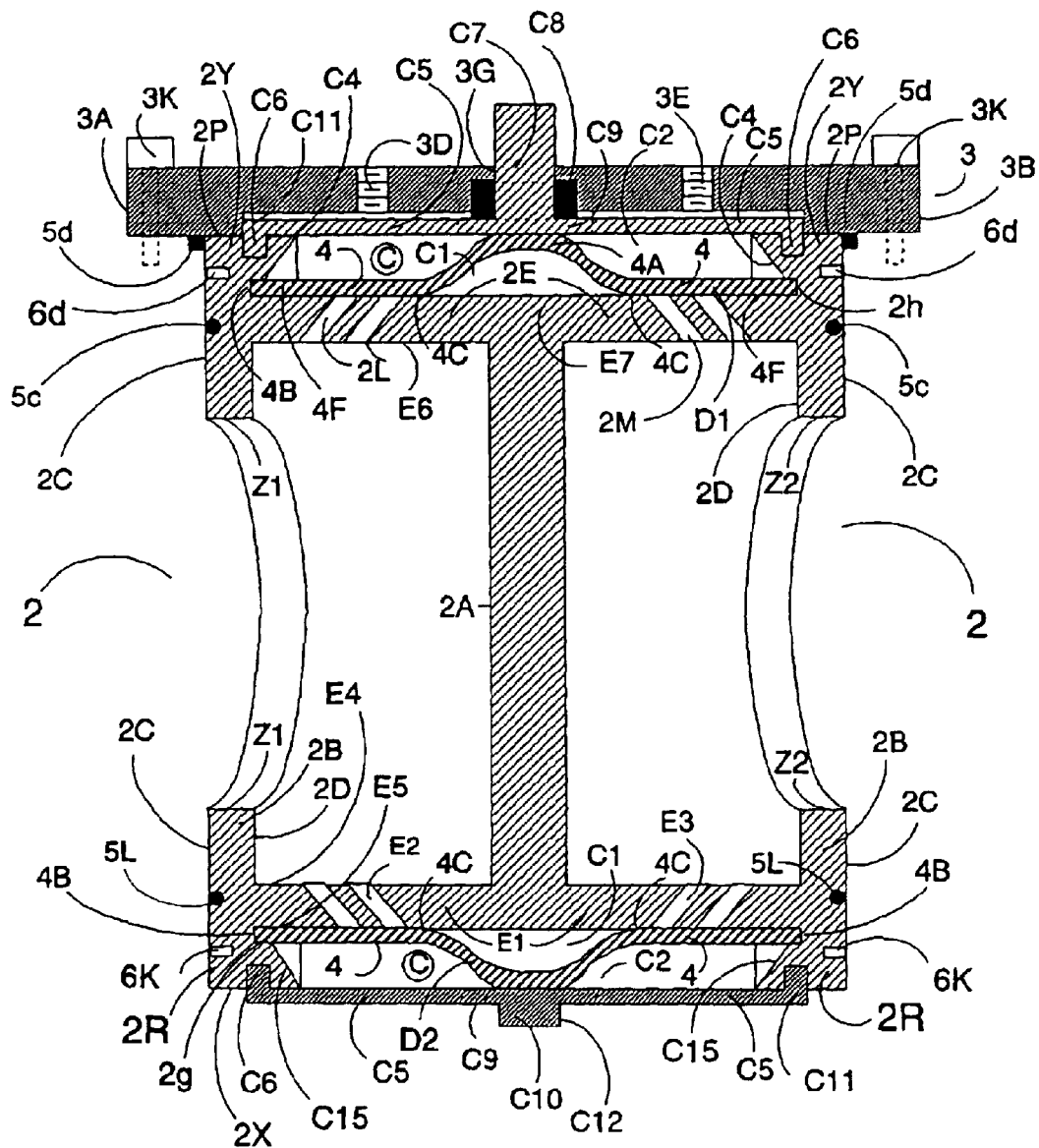
FIG. 3, is a vertical section of the third degree to sixth degree components of the valve, which include a cylindrical shut off valve, diaphragm, drive and the flat cover plate.

FIG. 3 shows the invented integrated shut off valve 2, which is integrated with the elastomeric diaphragms D1 and D2. Diaphragms D1 and D2 are collectively identified as D. Diaphragms D1 and D2 are equal in size and have common geometry. The cylindrical wall 2B of shut off valve 2 has an inner body between integral circular flat plates 2E and E1, which plates are parallel to the axis of the valve. The inner body is partitioned into two equal parts by partitioning means partitioning plate 2A. Two inner plates 2E and E1 are provided with inlet openings 2L and E2 on the inlet side of the valve, and outlet openings 2M and E3 on the outlet side of the valve. The cylindrical wall 2B extends on both sides of the flat plates 2E and E1, where the opposite extensions of wall 2B beyond plates 2E and E1 are designated by 2y and 2R. These walls may have the same continuous geometry of wall 2B or they may be different in geometry from wall 2B, as shown by inward forwarding inclines C4 and C15. The inclines C4 and C15 are of the same degree though they are designated by assigning different numerals. The opposite outer ends of outer cylindrical walls 2Y and 2R are depicted by 2P and 2X. Two intermitting circumferential grooves in walls 2Y and 2R are shown by 6d and 6k for the mounting of wedge and bolt bearings. Secondary seals are depicted by 5c, 5d and 5L. The wall 2B is provided with two opposite openings Z1 and Z2. Outward, and beyond the seats 2E and E1, cylindrical walls 2Y and 2R create two open ended cavities C of equal depth. By folding the fringes of the hat shaped diaphragms D1 and D2, they are mounted into said cavities C. Preferably, their circumferetial ends shown by 4B are tucked into the corresponding circumferential groove 2h, though a 45 degree angle of the incline is equally effective to hold the end 4B in place. Said flat seats 2E and E1 may be departed from their flatness. Circular plates 2E and E1 may be provided with slight circular forward tapering, outward away from the center of the valve, and toward the axis of the cylinder 2B, or they may be provided circular forward tapering inward toward the center of the valve, and toward the axis of cylinder 2B. Whether the plate 2E and E1 are flat or tapered, the flatness and tapering of the portion of the diaphragms between 4B and 4C will be adjusted accordingly by providing a slightly different taper to the diaphragms so that said portions between 4B and 4C have a snug fit. It is equally practical that said portions of diaphragm between 4B and 4C is kept flat for all diaphragms, and the squeeze applied to the hump 4A of the diaphragm by hub pedestal circular disk C9 (for the drive to rotate the shut off valve 2) can be adjusted to deform the diaphragm at 4C, so that 4C is in proper contact with the seats 2E and E1. Each diaphragm A1 and A2 divides each cavity C into two cavities C1 and C2 around the diaphragm. The monolithic drive to rotate the shut off valve 2 is shown by a shaft C7, hub pedestal disk C9, spokes arm C8, rim C11 and projected locking fingers C6 from C11 into intermitting plurality of grooves and bushing seal C8. The circular cover plate for the valve is shown by 3, with outer diametrical length 3A to 3B, and with circular opening 3G for the shaft C7. The plurality of bolts to tie the cover plate to the cage 1 are indicated by 3K. The openings to charge the diaphragms with fluid to control the fluid flow in the pipe line (by means of a needle valve and pilot control valve) are shown by 3D and 3E.

Figure 4:
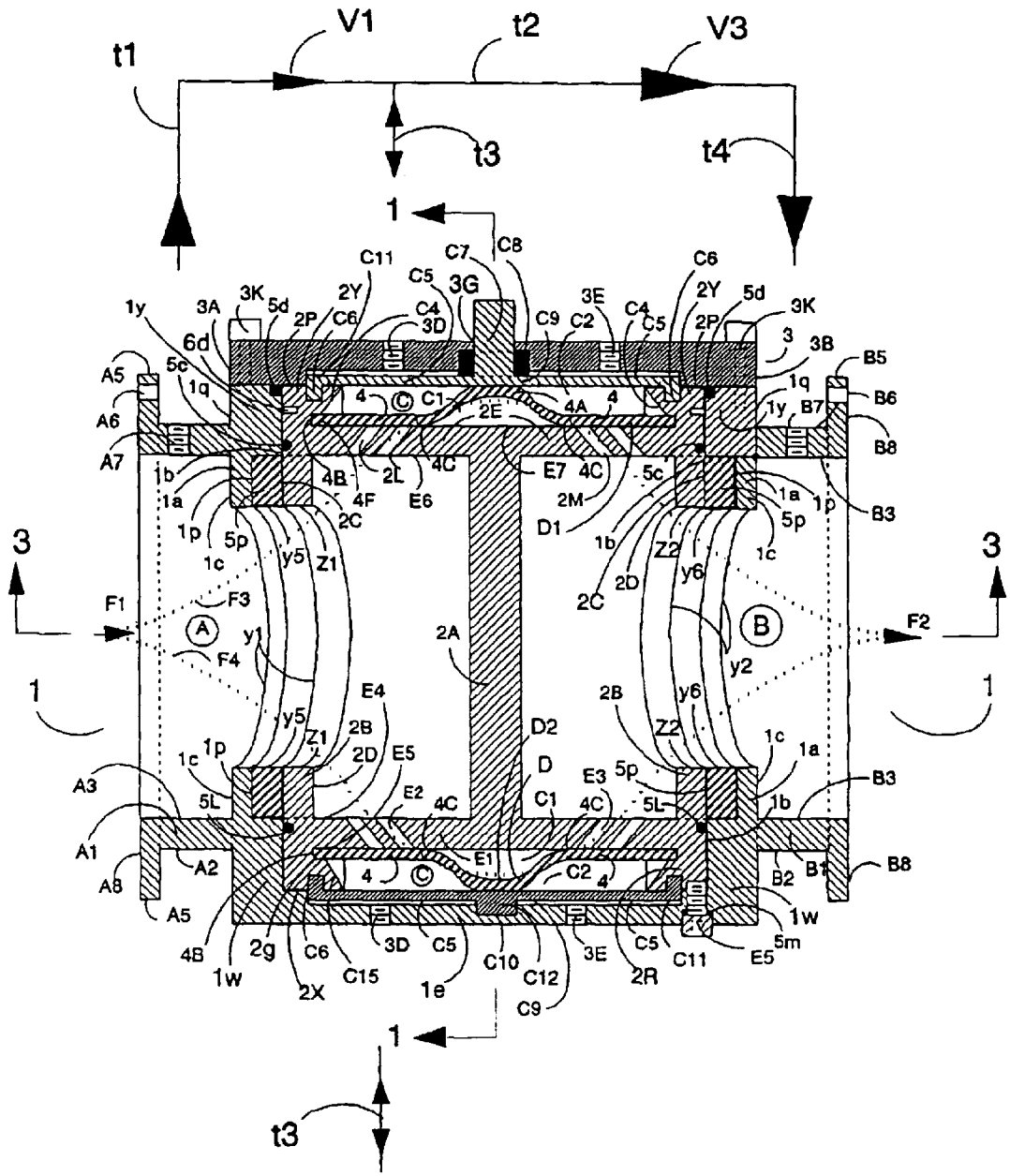
FIG. 4, is an axial vertical section through the center of the valve, where the cylindrical shut off valve provides two seats to two diaphragms. It shows the assemblage of FIG. 1 and FIG. 3.

FIG. 4 depicts the invented valve, which is the assemblage of components shown in FIG. 1 and FIG. 3 with the aid of FIG. 4 all other FIGS. can be studied together. The cage is depicted by 1, and its two opposite pipe pieces are indicated by A1 and B1, which are considered as outer parts of the cage. Outside and inside diameters of pipes A1 and B1 are shown by A2 and B2; and inner diameters are indicated by A3 and B3 respectively. Pipe A1 provides the inlet (from the pipe not shown) to the valve, and it has connector flange A8 with outer diameter AS and bolt openings A6. Pipe D1 provides the outlet from the valve (to the pipe not shown) and has flange B8 with outer diameter B5 and bolt openings B6.

The cylindrical wall of the inner cavity (between seats 2E and E1) of the cage is depicted by 1a and its inner and outer surfaces are shown by 1b and 1c. The cylindrical wall 1a has two opposite openings y1 and y2. In the inner side 1b of 1a is constructed a groove 1p to accommodate a pipe tubular primary seal 5p. The elastomeric primary seal 5p is depicted in FIGS. 1, 2, 4, 5 and 6. Two opposite openings y5 and y6 are constructed in seal 5p, which match the openings y1 and y2. Once y5 and y6 are matched with the openings y1 and y2 then at least a set of two bolts 5Z (Shown in FIG. 6) are mounted into openings N1 and N2 (also shown in FIG. 7) of the primary seal 5p. The sections of 5p around openings y5 and y6 are slightly, (plus or minus two thousandth of a inch) thicker than the rest of the tubular primary seal. Thus, when the cylindrical shut off valve 2 is lowered into the inner cavity 1h of the cage, the outer surface 2C of the cylindrical wall 2B of the shut off valve compresses the seal 5p to a predetermined compression. Two bolts depicted by 5Z in FIG. 6 compress seal 5p against 1p and 2C, and they prevent the flow of the elastomeric material when the fluid under pressure is flowing through the valve. These bolts also serve to tie the primary seal in its intended location. The end of the bolt 5Z is depicted by 5W and a seal under the head of the bolt is depicted by 5x.

Hydraulically balanced, cylindrical shut off valve 2 has wall 2B which has two circular plates shown by E2 and E1 located inside the cylinder 2B, a distance away from its two open ends 2P and 2X. The plates E1 and 2E have an integral vertical partitioning means partitioning plate 2A which divides the shut off valve 2 into two equal symmetric parts. The outer and inner surfaces of flat plate 2E are indicated by E7 and E6. The outer and inner surfaces of flat plate E1 are shown by E5 and E4. The plate 2E has inlet and outlet opening means for the fluid passage shown by 2L and 2M for the entrance and exit of the fluid which the actuated diaphragm D1 controls. Plate H1 has inlet and outlet opening means for the fluid passage shown by E2 and E3 for the entrance and exit of the fluid which the actuated diaphragm D2 controls. The geometric design of the openings 2L, E2, and of 2M and E3, in the flat plates 2E and E2, can be varied to suit the requirement of the valve.

The rotatable cylindrical shut off valve 2 is held in the cage by locking means, which means can be ball bearings, roller bearings, bolt bearings or wedge bearings. In some applications locking bearing means may not be needed and the shut off valve can be rotated without any bearings. Wedge and bolt bearings are preferred, because wedge and bolt bearings can also be used to limit the rotation to a pre-specified amount of rotation. To limit the rotation of shaft C7, restricting elements can be mounted outside on cover 3. The wedge bearings and bolt bearings can be used in combination or the wedge bearings can be used on one end of the valve while the bolt bearing is used on the other end of the valve. Thus, the circumferetial grooves provided in outer surface 2C of walls 2Y or 2R are intermittent grooves of specified lengths. The method and the means to tie the shut off valve to the cage will be explained with the aid of FIGS. 4, 6 and 9 simultaneously. Shown in FIG. 6, the plurality of right angle wedge bearing ties depicted by 6a are mounted through the wall 1y of the cage through the corresponding grooves 6e and into the corresponding circumferential groove 6d in 2C of wall 2Y. The end 6f of the vertical leg 6h is held in place inside of corresponding circular groove 6c constructed in the cover plate 3, and the end section 6b of horizontal leg 6g is kept in place in groove 6d. The end portion 6b of leg 6g is pushed through the corresponding opening in wall 1y into the groove 6b. Groove 6e is an intermittent groove, and its circular length is approximately equal to the circular length of wedge 6a. Thus, the wedges are completely fixed in place in their corresponding grooves, and the cylindrical shut off valve can be rotated. Wedge bearings are mounted before the mounting of the cover plate 3, then the cover plate 3 is mounted and the wedge bearings get tied in place. It is pointed out here that wedge bearings, at least on one side of the shut off valve 2, are always kept independent of the cover, to assure that the shut off valve remains tied in the cage while the diaphragms are replaced. A wedge bearing is independent, when by inverting the wedge (i.e. turning it upside down), vertical leg 6h of the wedge is kept outside of the outer surface 1q of the cage, and it is tied to wall 1y or 1w by providing leg 6h with a central opening to pass a bolt k, shown in FIG. 9, to screw it to the wall 1y or wall 1w. When wedge 6a is thusly inverted, then the leg 6h of said inverted wedge (with longer leg 6g) will remain outside the wall 1y or 1w, and, though the opening for leg 6g in walls 1y and 2y, and also in walls 1w and 2R, will still be needed, groove 6e will not be needed. Said inverted wedge bearings are not shown.

Figure 6:
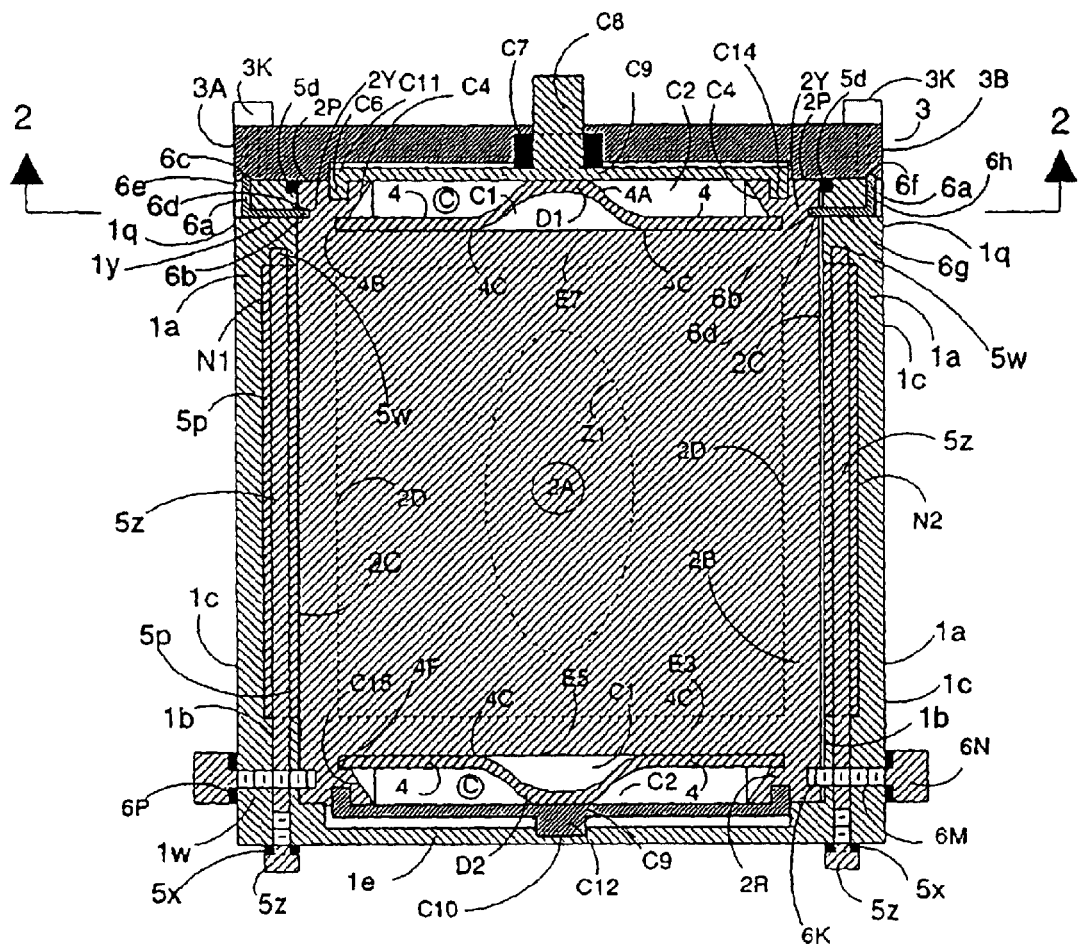
FIG. 6, is a transverse vertical section taken along the line 1—1 shown in FIG. 4.

For bolt bearings, shown in FIG. 6, are bolts 6N with seal 6P. The ends of the plurality of bolts are inserted into intermittent grooves 6k in wall 2R. Bolts 6N are mounted through the openings 6M in wall 1a. At least one or two restrictions in groove 6k are provided to limit the rotation of the shut off valve. The restricting elements in groove 6d and 6k can be synchronized with any other restricting elements provided elsewhere in the valve for the same purpose, to limit the rotation of the shut off valve. The shut off valve of this invention is shown as a quarter turn valve, therefore, at 90 degrees, at least one or two restrictions in the groove 6k are provided beyond which the valve cannot be rotated. It is pointed out here that the shut of valve can be other than a quarter turn valve.

Two elastomeric diaphragms D1 and D2, each resembling a hat, are mounted over surfaces E7 and E8 of circular flat plates 2E and E1. Since D1 and D2 are the same diaphragms of the same size, the same numbers are used to describe the diaphragms and the cavities around them. The central portion of the diaphragm shows hump 4A in its cross section, and its flat circular portion is shown by 4. The outer diameter of the diaphragm is indicated by 4B. The outer portion of the diaphragm near its fringe is indicated by 4F. Preferably, diaphragm portion 4 between 4B and 4C is constructed by tapering slightly toward 4C to assure its contact with the seat on which it is mounted. The diaphragm divides the space of cavity C into two sections; space C2 around the hump 4A, and the space C1 under the hump 4A. The circular portion 4 of the diaphragms between 4B and 4C covers openings 2L, 2M, and E2 and E3 on both sides of the partitioning plate 2A. The top cavity C for diaphragm D1 is defined by the space enclosed by the cover plate 3, circular wall 2y, and flat plate 2E. On the opposite side, the top cavity C for diaphragm D2 is defined by the space enclosed by circular wall 2R, flat plate E1, and flat end plat 1e. The walls 2y and 2R incline forward toward the center of the shut off valve which is depicted by C4 and C15. To tie the diaphragms D1 and D2 in FIG. 4, the end portion 4F (with outer end 4B) of diaphragms are tucked in the corresponding groove provided in the walls 2y and 2R. The length of the groove and the extent of 4F tucked into that groove depends on the size of the valve. In FIGS. 10 to 13 where walls 2Y and 2R are not provided an incline, the end portion of each diaphragm is tied by means of ring 4D and bolts 4G.

Now the valve drive mechanism shown in FIGS. 3 to 6 and FIG. 9 to drive the shut off valve will be explained. The valve drive has a shaft C7 passing through opening 3G of cover plate 3. The shaft C7 is connected to the wall 2B of the shut off valve 2 through the intermediate integral radial means of pedestal C9, spoke bars C5, rim C11, and the end connector locking means C6. The disk pedestal C9 presses against hump 4A of the diaphragm $D_1$ and compresses the diaphragm D1 against seat E7 when the cover plate 3 is bolted down to the wall 1y. From the rim C11, protruded fingers C6 are inserted into corresponding holes in wall 2y. Bushing seal C8 is provided to block the exit of the fluid flow. An extra seal may be provided to seal the exit of fluid around the shaft C7.

Figure 9:
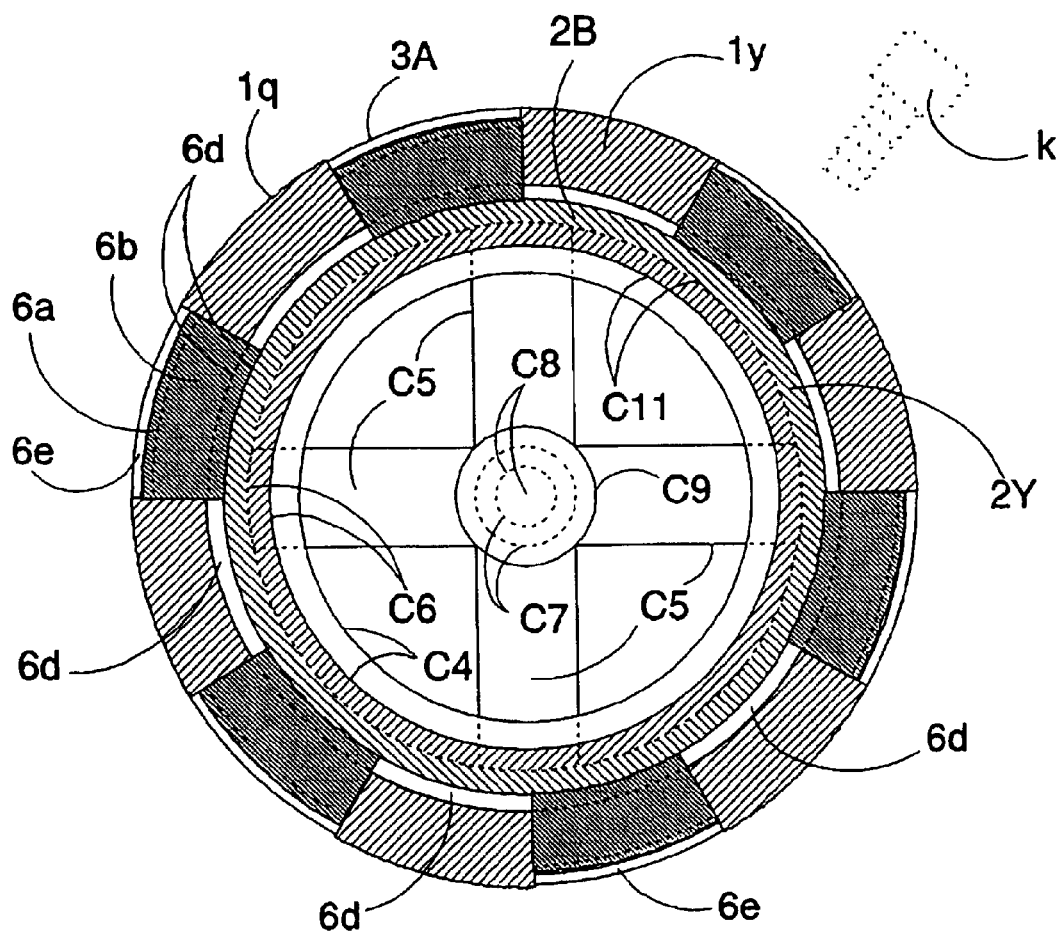
FIG. 9, is a horizontal transverse section taken along line 2—2 in FIG. 6, depicting a locking wedge bearing, and the valve drive.

The same drive as explained above is provided on the opposite side of the valve, where pedestal hub disk C9 slightly presses against hump 4A of diaphragm D2, and compresses the diaphragm against seat E8. The shaft C7 is shorter than shaft C12, and it does not exit groove C10 in the bottom cover plate 1e, as does shaft C7 through cover plate 3. Shaft C12 may be provided a bushing similar to bushing C7. It is pointed out here that spoke bars C8 of the drive explained above can be nothing more than a complete disk provided with some openings to balance the fluid pressure on both sides of the disk. Once all the components are installed, then the cover plate 3 is bolted down to wall 1y by means of bolts 3K, while at the same time it catches the top 6f of the vertical legs 6h of the wedge bearings 6a in its corresponding peripheral inner groove 6c. For the sake of clarity, wedge are not shown in FIG. 4 and are shown in FIGS. 6 and 9 only. It is pointed out here that in many cases, it might be sufficient to provide wedge bearings only on one side of the shut off.

The shaft C7 is rotated manually or by an actuator or by an electric motor, which rotates openings Z1 and Z2 in FIG. 4 to close or to open the shut off valve.

Secondary seals are shown by 5c, 5L, 5d and 5m to block fluid from exiting the valve. It should be noted here that the thickness of wall 1y and 1w may vary from the thickness of wall 1a which lies below seats 2E and 1E. The outside diameter of wall 1y is shown by 1q, which is the same for wall 1w. The diameter of the cover plate 3 is shown by the length between 3A and 3B, which may be greater than diameter 1q. Thus, the vertical leg 6h and corresponding groove in the cover plate, to hold the wedge 6a in place, will lie beyond 1q.

The flow through the valve is depicted by arrows F1, F3, P4 and F2. The inlet chamber of the valve is indicated by A and the outlet chamber of the valve by B. Openings A7 and B7 are provided in the walls of pipes A1 and B1. Two sets of openings indicated by 3D and 3E are provided in the cover plate 3 and in the bottom plate 1e to connect the pilot control valves.

Now the operation of the valve will be explained. The fluid F1 (which may be liquid, air or gas) from the upstream pipe, enters inlet chamber A and flows in a divided path F3 and F4, and the same fluid F2 exits the valve through outlet chamber B. Now the control means, which are comprised of the needle valve and pilot control valve, are used to control the flow control means, which are elastomeric diaphragms (or pistons, as in FIG. 14), and how the valve functions, will be discussed. Opening A7 is connected to control means needle valve V1 through tube t1, and tube t2 between needle valve V1 and pilot control valve V3 is connected to two threaded openings depicted by 3D (provided in cover plate 3 and in bottom plate 1e) by means of a two way loop tube t3. The pilot control valve V3 is connected to threaded opening B7 by means of tube t4. By keeping the pilot control valve V3 closed, cavities C1 and C2 around diaphragms D1 and D2 get charged with fluid, and the flat portion 4 of D1 and D2 close shut all the opening passages means for the fluid 2L, 2M and openings E2, E3 in plates 2E and E1 respectively. The opening passages means, for fluid flow, are equally divided and evenly distributed about the partitioning means. Once the valve V3 is opened to modulate, the fluid pushes away the diaphragms D1 and D2 from the openings provided in said two seats 2E and E1, and makes its path from inlet chamber A, to chamber B, thence out of the valve into the down stream pipe which is not shown. Two optional opening 3E in cover plate 3 and base plate 1e are provided to add additional control valve or valves if design requires. Additional openings may be provided for a check valve. Like any other conventional pressure reducing or pressure relief valve, the invented valve is controlled by means of needle and pilot control valve.

Figure 5:
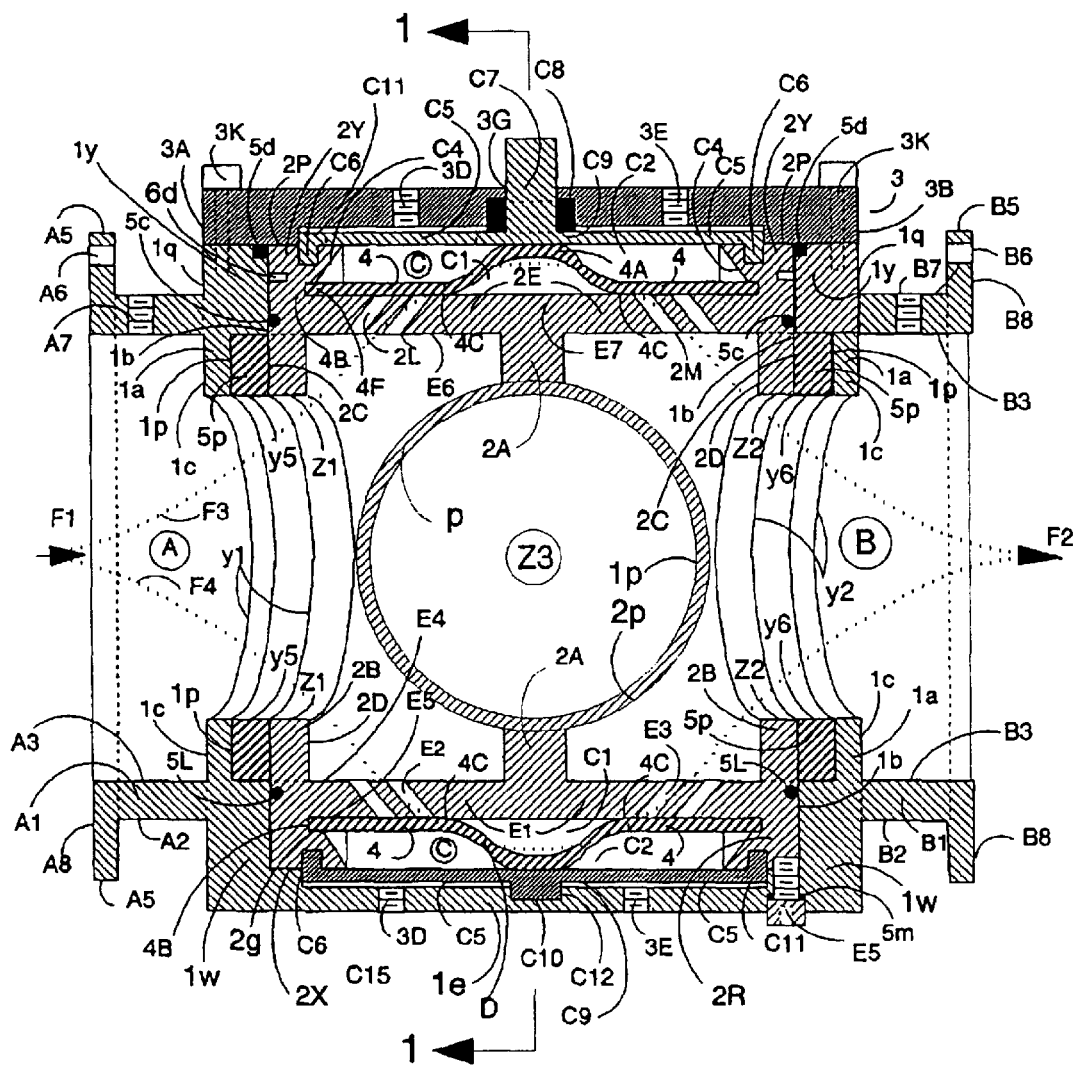
FIG. 5, is similar to FIG. 4, but the cylindrical shut off valve is provided with four openings in its cylindrical body, where two openings are provided by partitioning pipe integrated with the cylindrical wall of the shut off valve.

FIG. 5 is the same as FIG. 4, the only difference being that the cylindrical wall 2B of the shut off valve is provided with four openings in FIG. 5 instead of two. Two additional openings are provided by the pipe p, which pipe has outer diameter 2p and inner diameter 1p. The opening through the pipe p is indicated by Z3. The central portion of partition plate 2A is excavated, and pipe p is integrated with the partitioning means partition plate 2A and with the wall 2B of the shut off valve 2. If the piped shut off valve is quickly turned from its opened position to its closed position, as is shown in FIG. 5, and a fluid surge is produced, the preset control valve V3, which limits the pressure rise in the pipe line, at once opens to relieve the pressure and to mitigate the surge by allowing the passage of fluid under the inflated diaphragms (where cavity C1 is enlarged to allow the fluid to pass through the opening passages in the seats 2E and E1), which diaphragms are controlled by the pilot control valve V3. The surge flow of fluid remains in the downstream pipe line. This is accomplished by said surge flow being discharged to the outlet pipe B1 of the shut off valve, and thence to the down stream pipe line. Thus the valve can function simultaneously as a shut off valve and pressure surge relief valve. From here after the valve in FIG. 5 will be called the "piped shut off valve". The piped shut off valve of FIG. 5 also can function as a pressure reducing valve, and check valve simultaneously. Conventional pressure relief valves require some place to which the surge flow is discharged, but, as explained above, in the case of this invented valve the flow surge is mitigated in the pipe line and it remains in the pipe line, thus, no additional place outside of the pipe system is needed to discharge fluid.

FIG. 6 already has been discussed along with other drawings, and it will be discussed along with FIG. 9 again.

Figure 7:
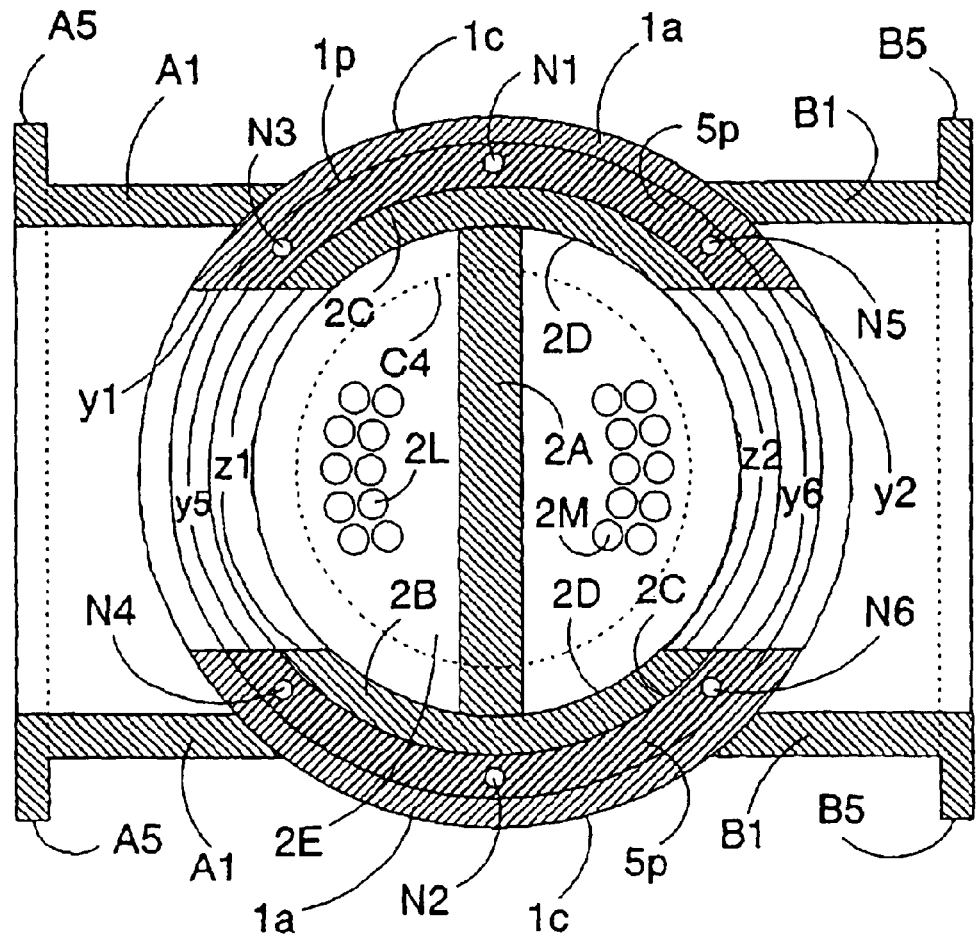
FIG. 7, is a horizontal transverse section taken along the line 3—3 shown in PIG. 4.

FIG. 7 shows the pipe tubular seal 5p in groove 1p, and its relative position with respect to wall 1a of the inner cage, and also its relative location with respect to wall 2B of shut off valve 2. The outer surface 2C of wall 2B remains in contact with the primary seal 5p. The thickness of the primary seal immediately around the inlet and outlet openings of the shut off valve is slightly thicker than elsewhere, to assure the proper seal of fluid. To augment the effectiveness of the seal 5p, at least two bolts 5Z shown in FIG. 6 are inserted into openings N1 and N2. The bolts function to prevent the displacement, under pressure, of the elastomeric material of the seal 5p. These bolts also fix the tube in a predetermined location. In larger size valves instead of two bolts, four bolts 5Z in openings N3, N4, N5 and N6 may be inserted. Instead of slanting openings as in FIGS. 3,4 and 5 FIG. 7 shows circular openings 2L and 2M in plate 2E. The size, the geometry, and the direction of the opening through the plates 2E and E1 may differ from valve to valve. Thus, circular openings are shown in this FIG. 7. The front inlet openings, to the shut off valve are shown by y1, y5 and Z1; and outlet openings from the shut off valve are shown by z2, y6 and y2. The other elements of FIG. 7 have been discussed before.

Figure 8:
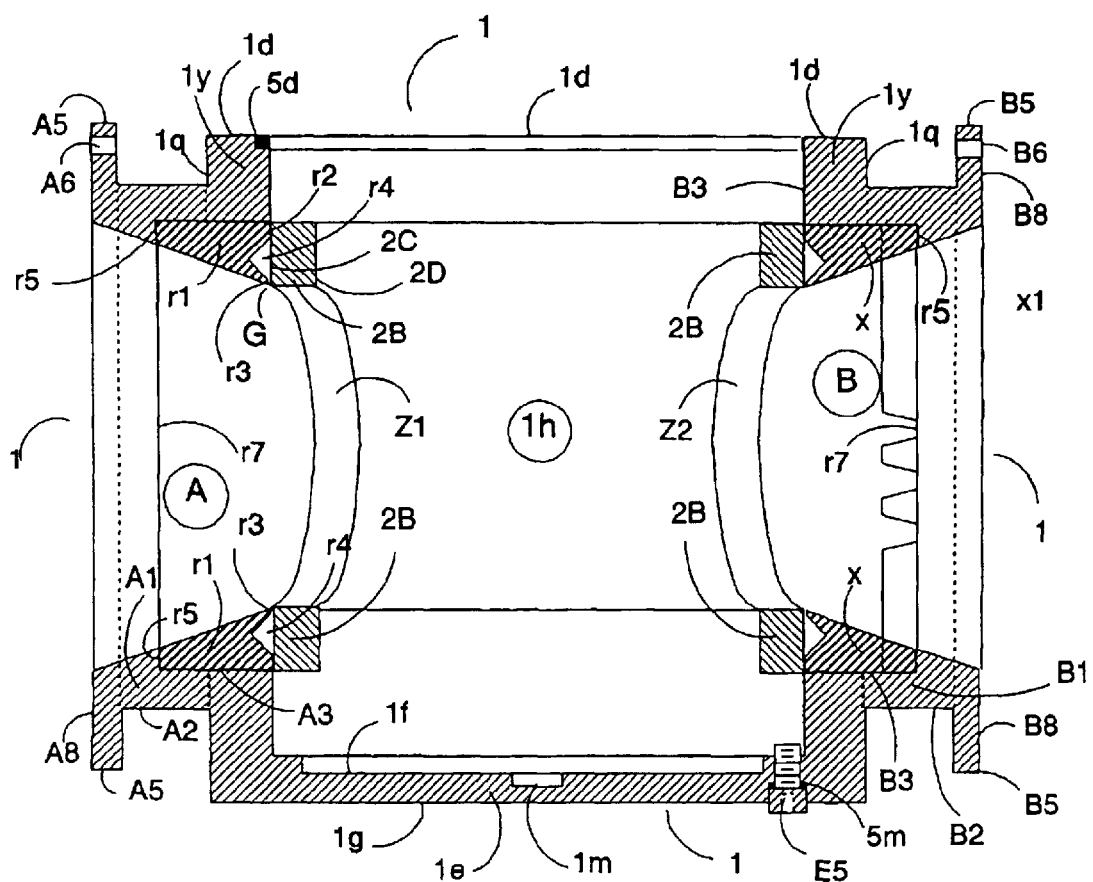
FIG. 8, is similar to FIG. 4, where the cage is provided with a reducer pipe inlet and outlet, and a reducer type of elastomeric gasket seal in relationship to the cylindrical wall of the shut off valve is shown.

FIG. 8 shows reducer elastomeric seals r1 and X in the reducer pipe inlet and reducer pipe outlet of the valve, and their relative positions with respect to wall 2B of the shut off valve. There is no difference in seals r1 and x. A slight gap G is provided between face r3 and surface 2C of wall 2B. Fluid enters cavity r4 and helps to balance the seal hydraulically to a great extent. Face r2 of the seal prevents the fluid from traveling further from the cavity r4. The back of the seal is shown by r8 which may be provided with indentations r7 to make the back act as a spring and to keep the seal always in contact with face 2C. Because the elastomeric material gives out to force, deflection of indentation r7 reduces frictional force to be overcome by the wall 2B of shut off valve when the valve is rotated. The rest of FIG. 8 was discussed earlier.

FIG. 9 was discussed along with FIGS. 4 and 6. FIG. 9 illustrates the concept of wedge bearings and the relative positions of locking wedges 6a with respect to wall 1y of the inner cavity of cage 1. It also shows the relative position of wall 2y of the shut off valve with respect to wedge 6a. It also shows how the end portion 6b of horizontal leg 6g is situated in groove 6d of wall 2y of the cylindrical shut off valve. The circumference of the cover plate 3 is shown by 3A, and the circumference of 1y is shown by 1q. The entrance grooves for leg 6h (also shown in FIG. 6), in the peripheral portion lq of wall 1y, are shown by 6e. The circumferetial groove in the outer surface of wall 2y is shown by 6d (also is shown in FIG. 6). The location of bolts for independent wedge bearings is shown by bolt k. The bolts k are used to hold vertical legs 6h of independent inverted wedges 6a to outer cylindrical surface lq of wall 1y. The independent wedge is a wedge when its top end 6f is not held in groove 6C provided in cover plate 3, and it remains independent of cover plate 3.

FIG. 9 also depicts the drive (of FIGS. 6, 5, 4, and 3) to rotate the shut off valve 2. It depicts shaft C8, pedestal disk C9, spoke bars CS, rim C11, and projected fingers C6. Fingers C6 are locked by mounting them into the corresponding cut grooves provided in wall 2y of the rotatable cylindrical shut off valve 2. Thus, by rotating shaft C8, the shut off valve 2 is rotated to open or to close the valve.

Figure 10:
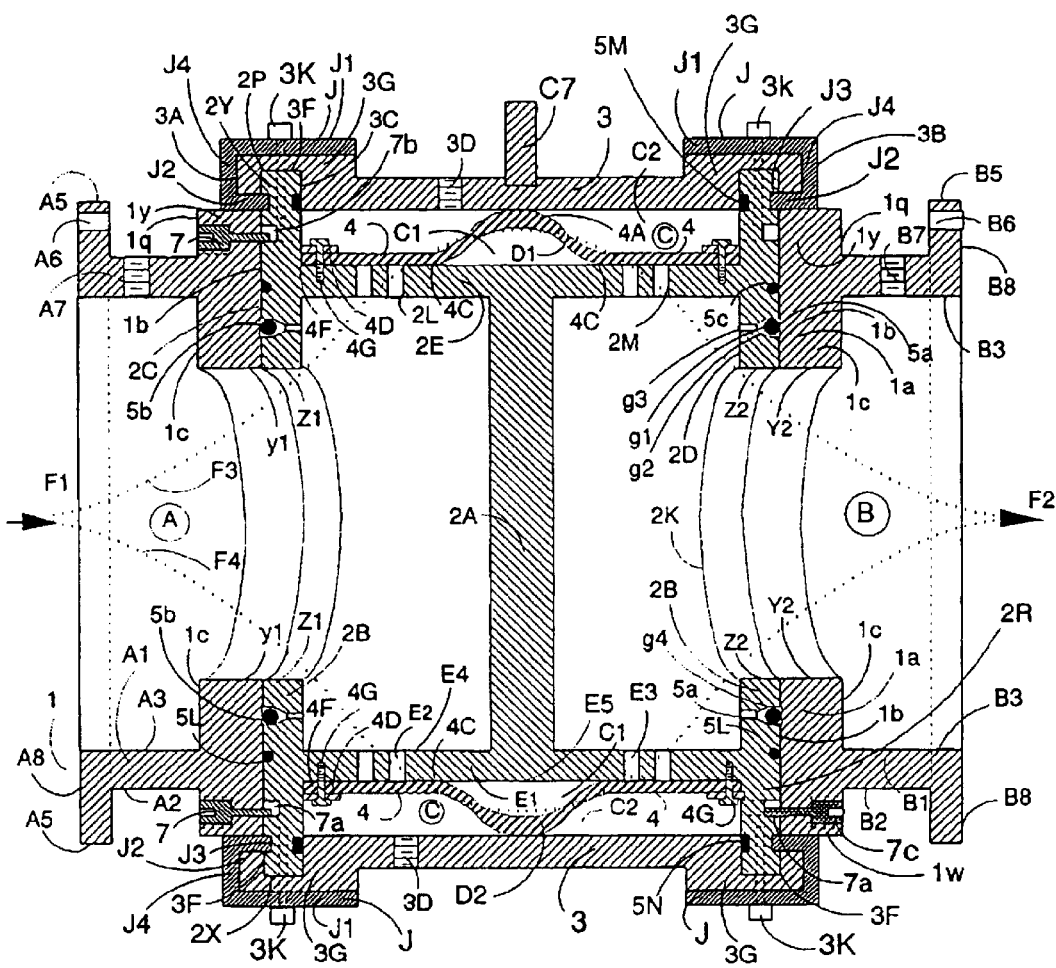
FIG. 10, is similar to FIG. 4, but shows step up cover means to rotate the cylindrical shut off valve, and different means to tie the diaphragms to their seats. It also shows bolt bearings, and a different type of gasket seal.

FIG. 10 is similar to FIG. 4; but it differs in that the valve drive is modified, and it differs in how the diaphragms fringe is tied to seat 2E and E1. In FIG. 10 inward inclines C4 and C15 of walls 2y and 2R are removed, and end portion 4F of each diaphragm D1 and D2 is tied to seat 2B by means of ring washer 4D and bolts 4G. The cover plate 3 itself becomes the drive to rotate the shut-off valve 2. A different type of seal 5b is provided for the cylindrical shut of valve 2. The openings 2L, 2M, E2 and E3, in seats 2E and E1, are vertical instead of slanting as in FIGS. 4 and 5. Instead of wedge bearings as shown in FIGS. 6 and 9, bolt bearings locking means are provided which are depicted by the plurality of bolts 7 and 7C and circular grooves 7a and 7b provided in walls 2R and 2y respectively. At least one bolt 7C in each groove 7a and 7b will have a longer stem than the stems of all other bolts, to traverse the entire depth of the groove and to create interference with at least one restriction provided by the raised bottom sections of the grooves inside the grooves 7a and 7b. Thus, by providing interferences at 90 degrees in said grooves 7a and 7b, the rotation of the shut off valve can be limited to 90 degrees. The same principle in designing the means for interferences for the wedge bearings shown in FIGS. 6 and 9 can be employed, and bolts 5Z in FIGS. 6 and 9 can be eliminated. The valve functions in exactly the same way as the valve in FIG. 4, and it will function exactly like the valve of FIG. 5, if it is provided with partitioning means pipe p instead of partitioning means partitioning plate 2A.

Figure 11:
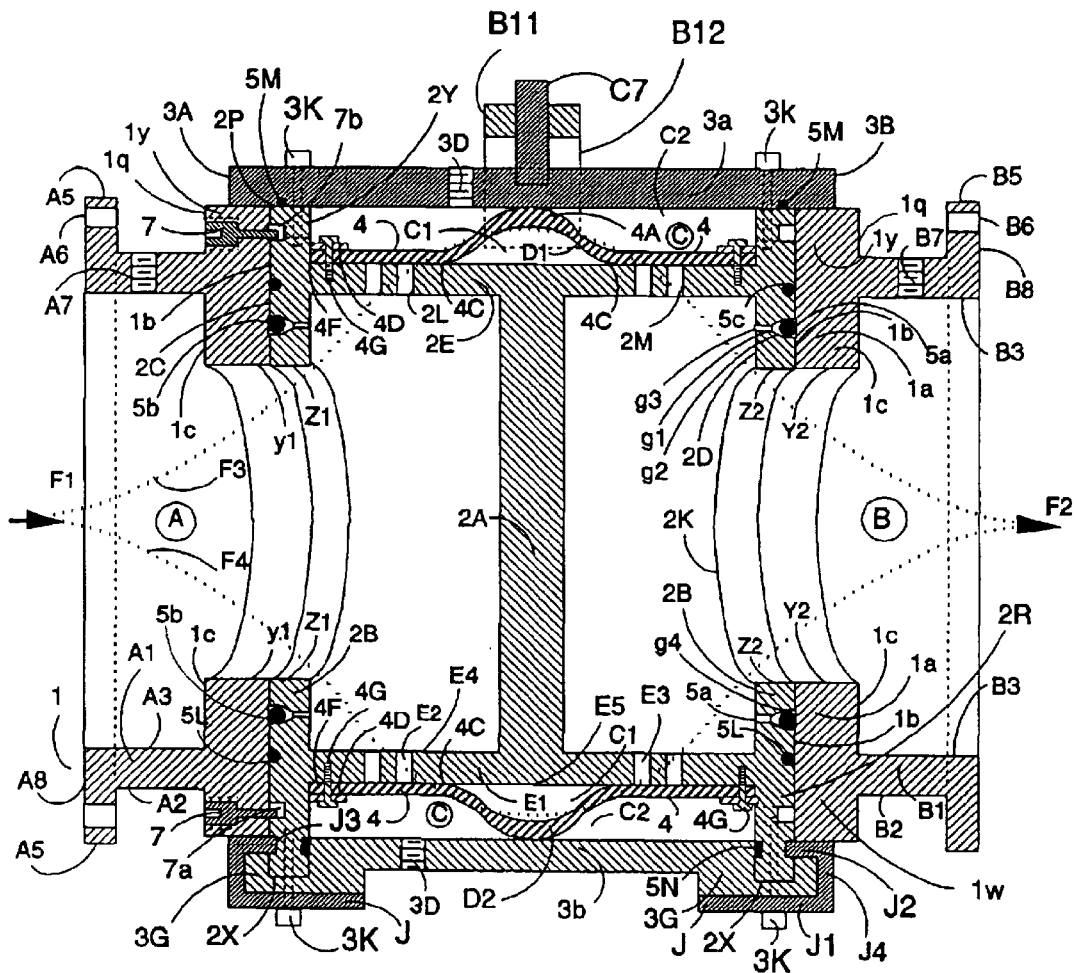
FIG. 11, is similar to FIG. 10, but two opposite cover plates differ from one another in design.

It is pointed out here that FIG. 10 and FIG. 11 can also be provided with piped partitioning pipe p as shown in FIG. 5.

The end portion 4F of diaphragm D1 is held to seat 23 by means of washer ring 4D, which has a common bolt circle with 4F. Washer ring 4D and end portion 4F are sandwiched together, and are tied against seats 2E by means of bolts 4G which are screwed to seat 2E.

The shaft C7 of the valve drive is situated in the center of cover plate 3. The shaft C7 can be integrally cast with cover plate 3 or it can be welded to that cover plate. The cylindrical wall 2y is extended on both sides equal in length to the depth 3C of groove 3F. On both sides of the valve 2, circular groove 3F is provided in the circular peripheral stepped up fringe portion 3G of cover plate 3, to catch the circular ends 2P and 3×of walls 2y and 2R. On both ends of the shut off valve a set of rotatable camming jaw means J are mounted over 3G to catch the circumferential groove J3. Said camming jaws means are invented by the inventor under U.S. patent Ser. Nos. 5,387,017 and 5,868,441. The jaw J has long leg J1 and the shorter leg J2 connected by a bridge J4. The end of jaw J2 catches the circumferential groove J3. Thus, by rotating camming jaws J simultaneously, groove J3 can be caught by means of J2, or by reverse rotation J3 can be freed from J2. Further, the jaws J, and 3G of cover plates 3 are connected and fastened together by means of threaded bolts 3K, which are screwed to walls 2Y and 2R. The ends of the plurality of bolt bearings 7 are mounted in the intermittent grooves 7b and 7a, and the shut-off valve can be rotated to a pre-designed rotation about its axis. In the same manner as in FIG. 4, shaft C7 of FIG. 10 can be rotated manually, by an actuator, or by an electric motor. In contrast to conventional shafts and also to the shafts of FIGS. 4 and 5, the shafts of FIGS. 10 and 11 require no bushing and sealing. For the electric motor, a seat can be provided by constructing a detachable bridge shown by B11 and B12 in FIG. 11, which bridge will cross over 3G of cover plate 3, and will be supported by means of brackets attached to the cylindrical wall 1a of cage 1. The actual design of the bridge is not shown. Two opposite seals depicted by 5b and 5a at the inlet and outlet of the shut-off valve are provided around openings Z1 and Z2 respectively. These seals 5b and 5a are placed in groove g2 constructed in the outer surface 2C of cylindrical wall 2B of the shut off valve 2. A plurality of openings g3 are provided for the entrance of fluid to act against the backs g1 of seals 5b and 5a to push them against surface 1b of wall 1a. These seals rotate along with the wall 2B of the shut off valve 2. The rest of the valve has been explained with other FIGS. The valve of FIG. 10 will operate the same as the valve of FIGS. 4 and 5. It is understood that the same type of needle valve and pilot control valve can be used for the valves in FIGS. 10, 11, 12 and 14. It is understood that seal gasket 5p, instead of seals 5a and 5b shown in FIG. 10, can be used with the valve shown in FIG. 10.

FIG. 11 is exactly the same as FIG. 10, except that the top rotatable cover 3 is a flat circular plate, which is tied to the circular top 2P of wall 2y by means of the plurality of bolts 3K, which are screwed into the wall 2Y. Thus cover 3 and 2B rotate together as a unit. The locking bearing bolts 7, and the shaft C7 have the same functions as explained in FIG. 10. Thus, the functions of the valve are no different than the functions of the valves explained in FIGS. 4, 5, and 10. As mentioned in the discussion of FIG. 10, a cross over bridge to provide a seat for an electric motor, or for an actuator, to operate on shaft 7, is depicted by B11 and B12. A seal to seal the exit of fluid from cavity C is shown by SM. It is pointed out here again that locking bolt bearings may be discarded in some applications of the valve, and the shut off valve 2 remains rotatable.

Figure 12:
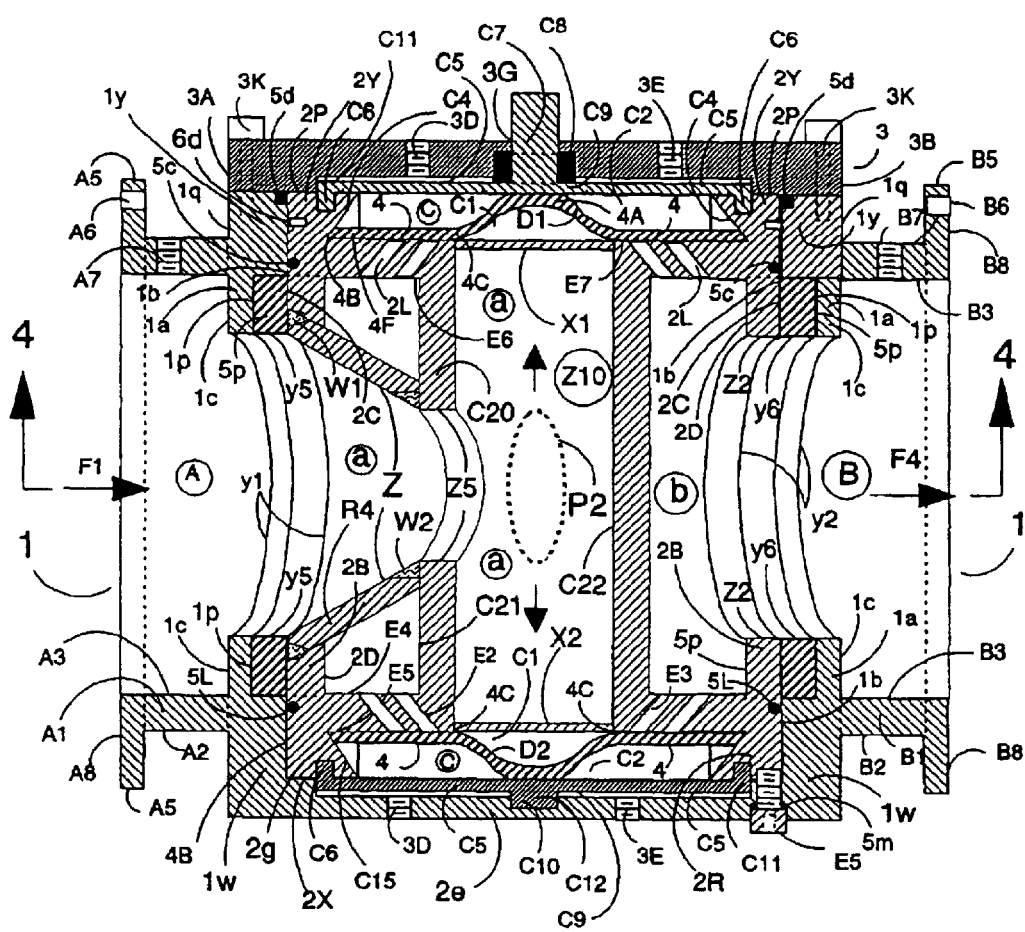
FIG. 12, is an axial vertical section through the center of the valve similar to FIG. 4, where the cylindrical shut-off valve is provided with an inner open ended concentric cylinder, and they are connected by means of a reducer pipe and two opposite seats of the shut off valve. The shut-off valve controls four way fluid flow.
Figure 13:
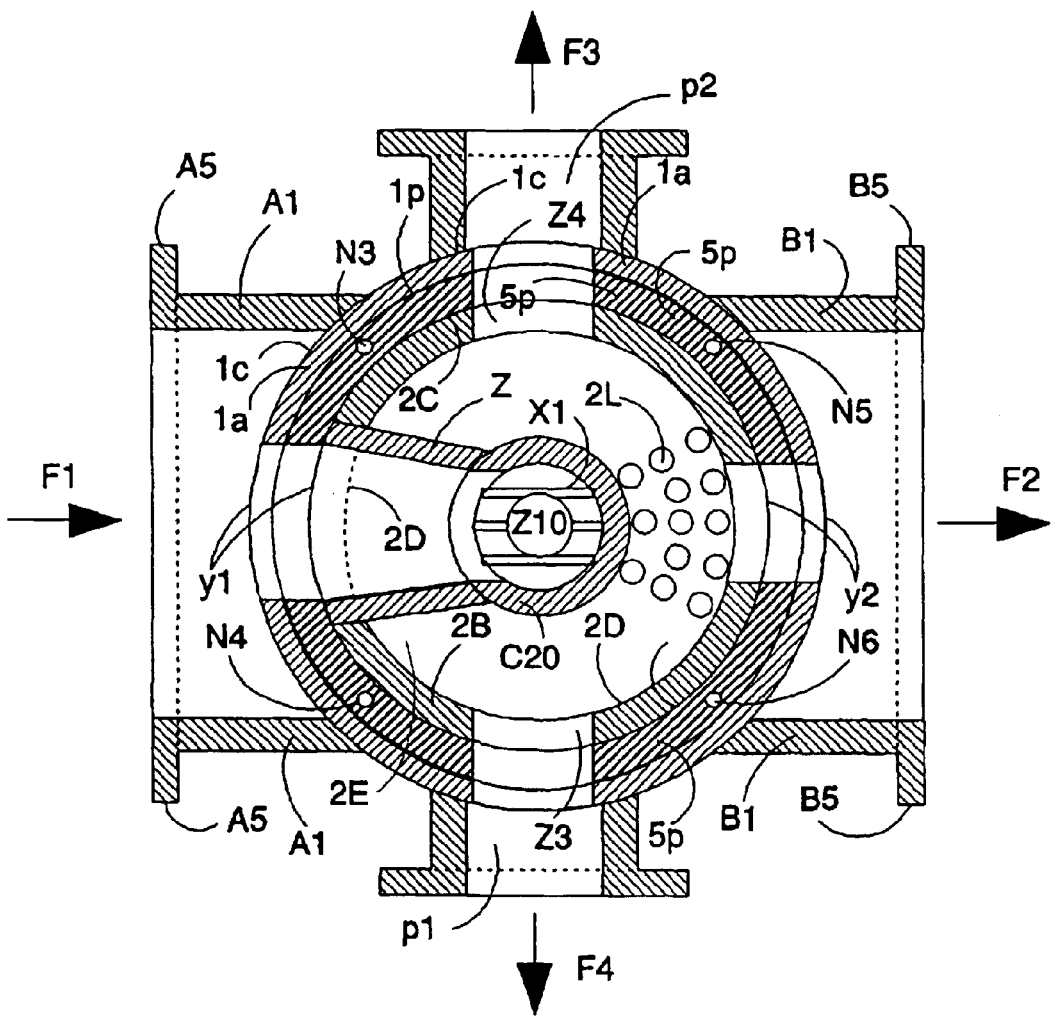
FIG. 13, is a horizontal transverse section taken along line 4—4 in FIG. 12, depicting four way flow.

FIGS. 12 and 13 will be discussed together. The cross-section taken along line 4—4 in FIG. 12, and shown in FIG. 13, is not a true cross-section, though FIG. 13 depicts a conceptual cross-section corresponding to FIG. 12. The sizes of the openings in FIGS. 12 and 13 are not the same, and are not to the same scale. The same will be the case in FIGS. 14 and 15. In FIGS. 12 to 15 the cylindrical partitioning means constituting a vertical pipe and a horizontal pipe reducer are used instead of partitioning means used in FIGS. 4 to 11. The valve shown in FIGS. 12 and 13 is for diverting the fluid flow by cylindrical partitioning means C20 and pipe reducer means Z (which are integrated with the cylindrical wall 2B of the cylindrical valve 2 by welding or by casting) in two more directions than the valves discussed up to FIG. 11. Two added pipe outlets are shown by p1 and p2. Within the cylindrical shut off valve 2 in FIGS. 12 and 13 is provided another concentric cylinder C20. The diameter and height of cylinder C20, are predetermined according to the intended functions of the valve. The inner and outer surfaces of C20 are shown by C21 and C22, respectively. The cylinder C20 is made integral with two seats 2E and E1 on which the diaphragms D1 and D2 rest. The central circular portions of flat plates 2E and E1 (shown in FIGS. 4 and elsewhere), along with partition plate 2A (or pipe p in FIG. 5), are removed. Cross bars shown by X1 and X2 are welded to C20 to prevent D1 and D2 from being sucked in, if a vacuum is developed. The opening Z1 in wall 2B of FIG. 4 is changed to a reducer opening Z in FIG. 12 by means of reducer pipe R4. The larger opening of reducer pipe R4 is welded to opening Z1 in wall 2B (which opening Z1 is seen in FIGS. 4 and 5), while the narrower end is welded around opening Z5 in the wall of inner cylinder C20. The opposite two cavities C1 shown in FIGS. 4 and 5, become one with the cavity Z10, inside cylinder C20. Through inlet chamber A, the fluid F1 enters cavity Z10 of cylinder C20, and it gets divided into two parts indicated by the arrows inside cavity Z10. Beyond cross bars X1 and X2 the fluid spreads radially and passes through openings 2L and E2, and spreads around the outer surface C21 of cylinder C20, till it discharges through three openings Z2, Z3 and Z4 in the wall 2B of the shut off valve 2, and enters into pipe pieces p1, p2 and B1 (as shown in FIG. 13). Down-stream pipes are not shown. The diaphragms of the valve are controlled as described under FIG. 4. Thus a single pilot control valve can control the fluid supplied down stream to three branches of pipes. The valve can be a shut off valve for all the pipe lines or it can shut off any one of the down stream openings while keeping the other two openings open. The valve also can divide the fluid proportionally, according to the size of openings down stream. The function of the cylindrical gasket seal 5p is the same as in FIG. 4. As explained earlier under FIG. 4, the thickness of the gasket is slightly more in the sections of openings than elsewhere. Four openings 93, N4, N8 and N6 are provided for bolts 5Z, which are shown in FIG. 13. The rest of the valve already has been discussed along with other FIGS.

Figure 14:
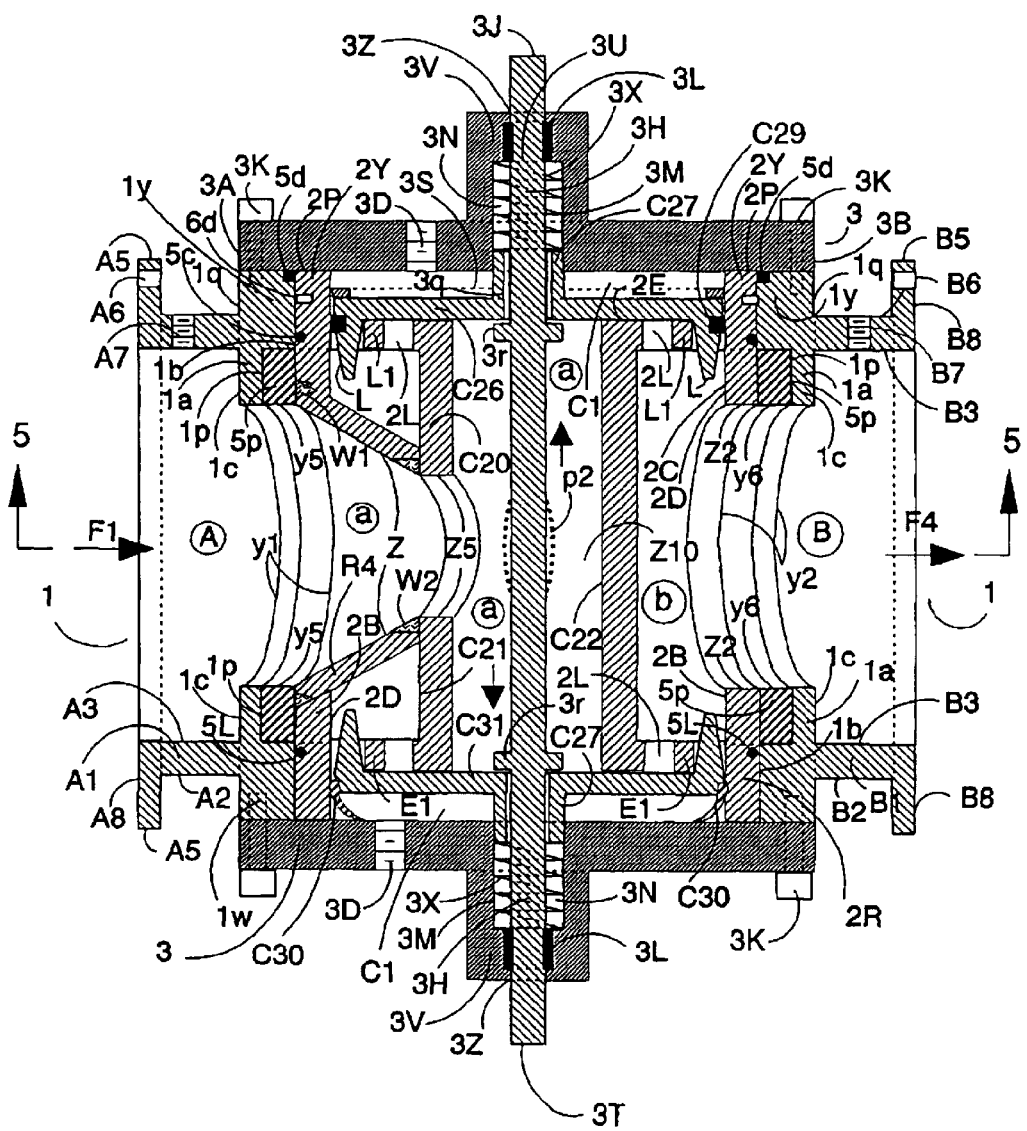
FIG. 14 is an axial vertical section through the center of the valve similar to FIG. 12, where the shut-off valve is provided with pistons, instead of diaphragms to control the fluid flow.
Figure 15:
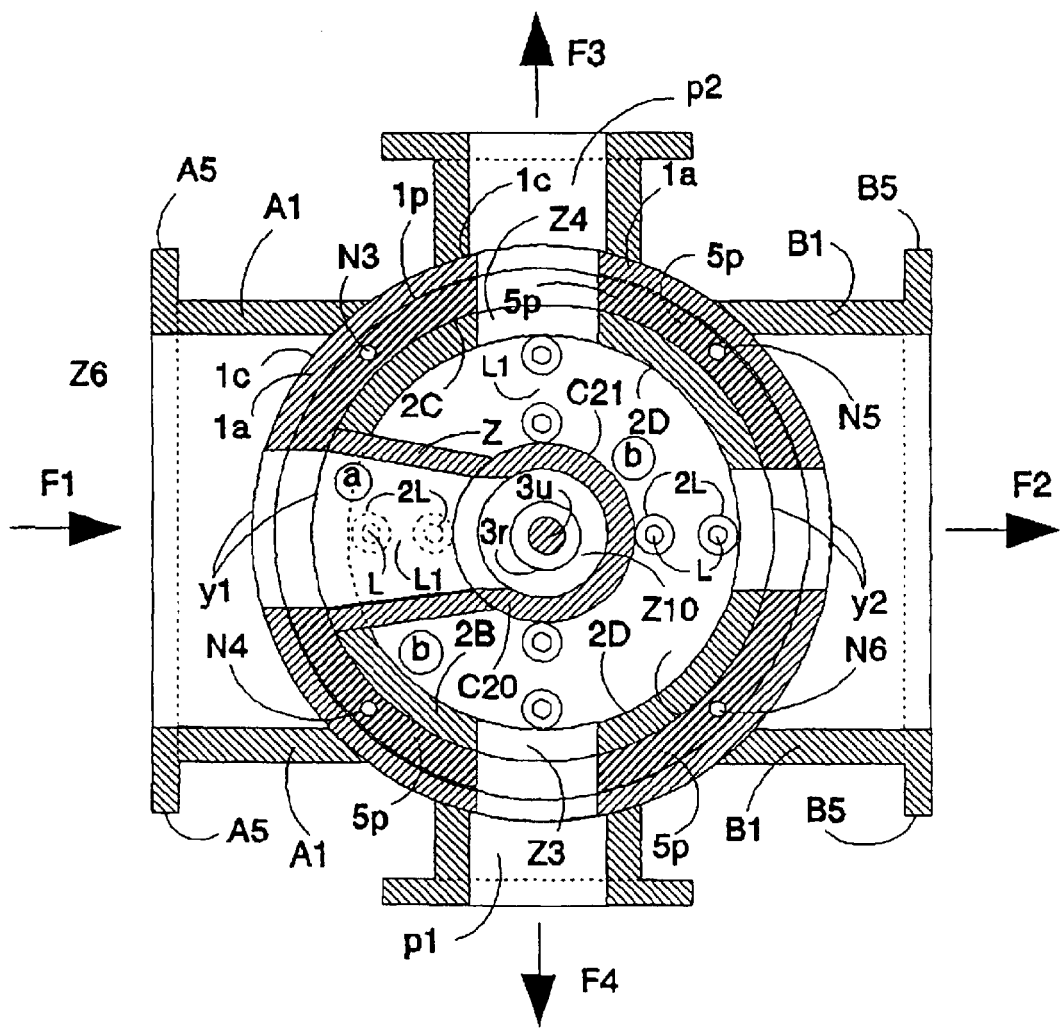
FIG. 15 is the horizontal transverse section taken along the line 5—5 in FIG. 14.

FIGS. 14 and 15 can be studied together. FIGS. 14 and 15 are similar to FIGS. 12 and 13, except that the diaphragms D1 and D2 are replaced by two pistons to control the fluid. The piston and cover on one side are the exact mirror image of the piston and cover on the opposite side. It is understood that when one side is being explained the other side is simultaneously explained. Only those parts will be discussed here which are modified or new, and were not discussed previously.

The two pistons C26 and C31 are mounted around a common rod 3U with ends 3J and 3T. Each piston is held between pedestal 3r on said common rod and cover 3. Pistons C26 and C31 rest on seats 2E and E1 as did diaphragms D1 and D2 in FIG. 12. The seats 2E and E1 are provided with circular openings 2L, and at least two conical bars L from the piston C26 or piston C31 are projected through openings 2L. If the valve is designed to reduce a very high fluid pressure in the pipe line to a low pressure, then conical barb L is projected through each circular opening 2L. The barbs L provide dead end strikes against the fluid flow to dissipate energy. In larger size valves, the barbs can be hollowed to reduce the weight of the piston. The number and the size of the openings and barbs are predetermined according to the size of the valve. Each piston has a hollow shaft C27 provided with a square cross-sectional opening 3g, which is mounted around a corresponding square section 3H of rod 3U, and the rest of the shaft is circular in cross-section. The square section of rod 3U extends from 3r and through the entire length of the circular cavity 3K of cover 3. The inner surface 3M of cavity 3N and outer surface of hollow shaft C27 are provided with a loose fit. The cavities 3N and C1 are kept fluid communicative for the fluid to flow between two cavities. The opposite cavities 3N are loaded with counter weight springs 3x. Springs 3x keep the pistons in contact with seats 2E and E1 when no fluid is flowing through the valve. Ring 3S may be provided to retain space for fluid between cover 3 and piston C26 when they are nearest to each other. The covers 3 are held to the cage by means of bolts 3K. Either type of seal C29 or C30 may be provided for the pistons. The outer portion of tubular seal C30 for piston C31 is provided serration for deflection. Seal C30 can also secure space for fluid between cover 3 and piston C31 when they are nearest to each other.

The fluid enters the cylinder C20 through chamber A and the opening Z5 of reducer Z. When the two cavities C1 are charged with the fluid through openings 3D, and the pilot control valve V3 is opened (shown in FIG. 4), the pistons start to modulate to control the flow of fluid through the valve. The openings A7 and B7 in valve pipes A1 and B1; and openings 3D in covers 3 in FIG. 14, have the same functions as discussed in FIGS. 4 and 5. Though needle valve V1 and the pilot control valve V3 are not shown in FIG. 14, it is yet understood that they are used with the piston valves depicted in FIG. 14, and that they function the same way as they function with the valve in FIGS. 4 and 5. The diverted fluid shown by arrows inside cylinder C20 acts against the pistons C26 and C31. When the valve opens, the fluid spreads radially over seats 2E and E1, and around the outer surface C21 of cylinder C20. The modulating opposite pistons control the flow through the valve, and the valve can act as a pressure reducer or as a shut off valve. The valve can control flow to all the outlets simultaneously. The end 3J of shaft 3U can be rotated by means of an electric motor, and end 3T can be rotated manually. Thus, the shaft 3U, and pistons C26 and C31, by means of conical barbs L passing through openings 2L in seats 2E and E1, provide a drive to rotate the shut off valve 2, to block the fluid flow to any one of the openings y1, y2, p1 and p2 or shut the flow entirely to all openings. The rest of the elements of FIGS. 14 and 15 were explained with other FIGS. A seals between seat 2E and piston C26; and a seal between seat E1 and piston C31 may be a surface to surface seal, or any other type of seal may be provided. It is also understood that any seals along with their grooves may be eliminated if not required. If steam is going through the valve, the only seals which will be needed are 5d and 3L. It all depends on how much leakage through the valve is permitted, and what kind of fluid is controlled.

Figure 16:
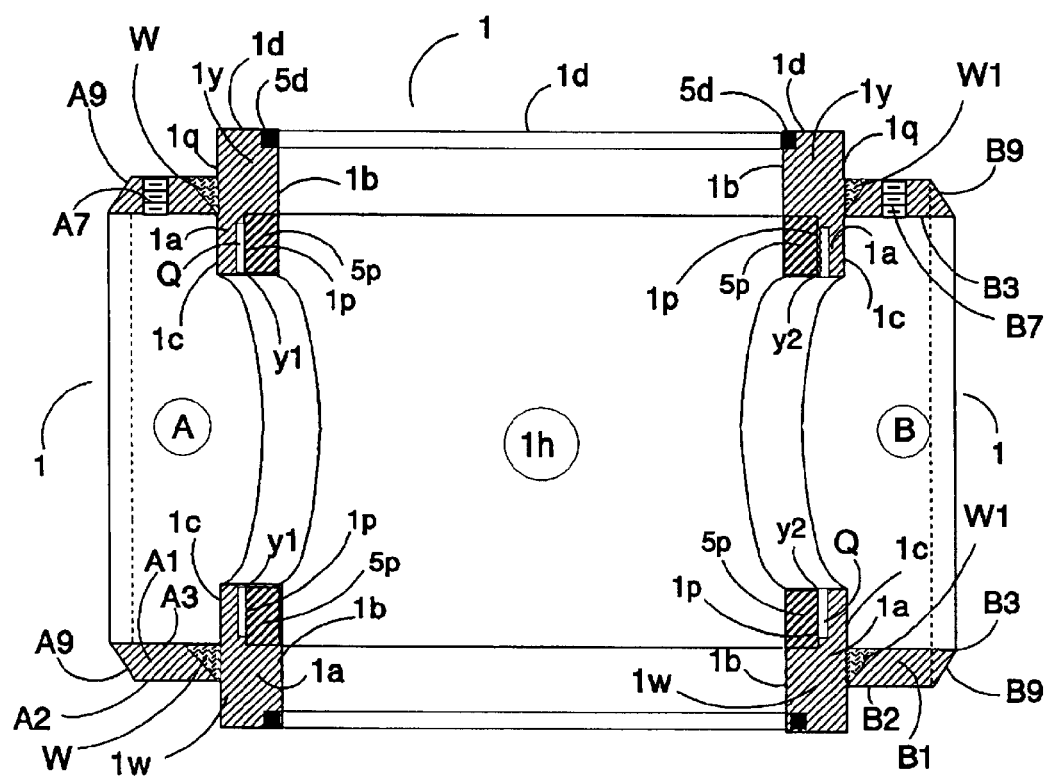
FIG. 16 is an axial vertical section of the open ended cylindrical cage, the first degree component, where said cylindrical cage is directly welded to the inlet and outlet pipes of the pipe line, and integral inlet and outlet pipes of the cage are entirely removed.

FIG. 16 is an axial vertical section of the open ended cylindrical cage, the first degree component, where said cylindrical cage is directly welded to the inlet and outlet pipes A1 and B1, where now pipes A1 and B1 represent pipes from the pipe line. The welding of the pipes, to connect them to the cylindrical valve at the inlet and outlet sides, are shown by W and w1 respectively. The cavity depicted by Q is provided for ease of mounting the cylindrical shut off valve and for ease of rotation of the shut off valve.

Figure 17:
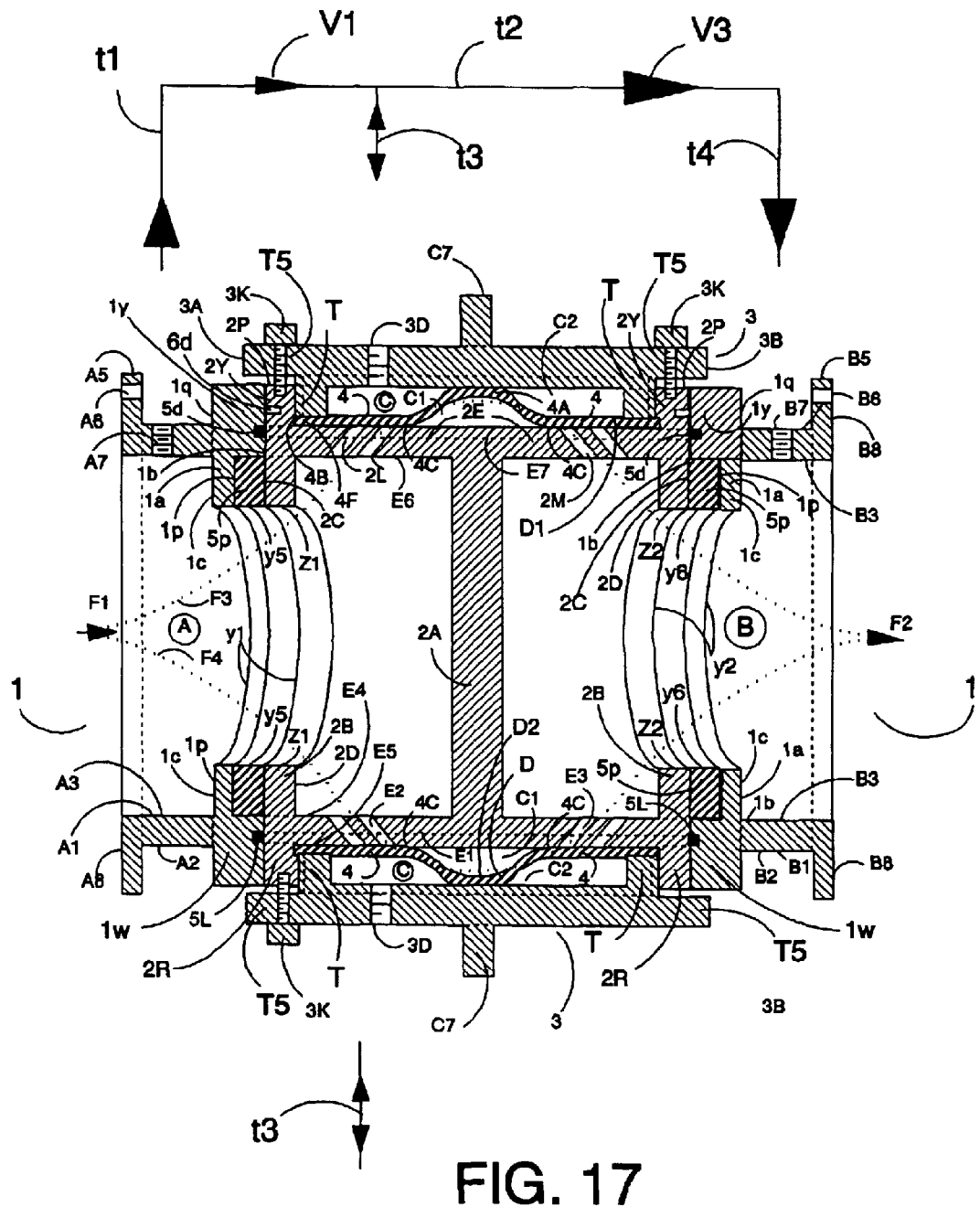
FIG. 17, is an axial vertical section through the center of the valve, and it is the same FIG. as FIG. 4, but is shown with two threaded covers.

FIG. 17 is the same valve as in FIG. 4, but two opposite covers 3 on opposite ends of the cylindrical shut off valve 2 are provided. The inward projected cylindrical threaded flange T of each cover 3 is mounted inside the threaded inner faces of cylindrical walls 2y and 2R, wherein the fringe 4F of each diaphragm D1 and D2 are tied down to seats 2E and E1 by the compression force of the threaded flange T. Thus fringe 4F also acts as a seal against the leakage of fluid from the cavity C. A plurality of bolts 3K restrict the cover from unscrewing. Quarter turn restrictions can be provided to limit the rotation of the cylindrical shut off valve by providing restricting elements between covers 3 and opposite cylindrical walls 1y and 1w of the cage. The shaft C7 of each cover can be rotated manually or by an actuator or by an electric motor. For an electric motor, the bridge shown by B11 and B12 in FIG. 11 can be provided. The locking bearings described in FIGS. 6 and 9 can also be used. Two opposite gasket seals between the cage and the cylindrical shut off valve to stop leakage of fluid are shown by 5d and 5L. The rest of the valve has been discussed under FIG. 4 each.

It is clear by now, that the flow of fluid can be blocked not only by rotating the shut-off valve 2, but the diaphragms and pistons can also function as shut of valves as well. This adds an extra margin of safety, when shutting off fluid flow.

It is shown that the shut off valve 2 can be provided with more than one type of gasket seals, and more than one type of flow control means to control the fluid through the valve. It is also shown that the same cage can be used to accommodate several types of valves. It is also understood that the valve can be manufactured from more than one type of material. Corners will all be rounded to desired roundness. Other types of gasket seals not shown in the drawings may be adapted anywhere in the valve to replace the gasket seals shown in the drawings. It is also understood that various types of restricting elements to limit the rotation of the shut off valve can be employed. It is also understood that locking bearings are optional and may not be required in many cases, especially where the pipelines are short and where the flow of fluid in the piping system comes to a halt at once. Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A fluid control, pressure reducing valve, comprising:
  a cylindrical cage, having at least one inlet opening to receive fluid from the upstream pipe of the pipeline, and one outlet opening to discharge fluid to the downstream pipe of the pipeline, and said cage configured to receive a rotatable cylindrical shut off valve in said cage's inner cylindrical cavity, whith the cylindrical shut off valve having the same number of correspond matching openings as whatever the cage has, and with said cylindrical shut off valve having two opposite seats with equal and evenly distributed plurality of openings that are passage means for the passage of fluid, and said seats are connected with a partitioning means to create an inlet chamber to receive fluid from the inlet of the cage and an outlet chamber to discharge fluid to the outlet opening of the cage;
  flow control means, responsive to pressurized fluid, located on said seats to block and to control fluid flow through said passage means for the passage of fluid;
  means to supply pressurized fluid to said flow control means for controllably restricting each of said passage means to thereby control flow of fluid through the valve;
  drive means to rotate, with respect to the cage, said cylindrical shut off valve received in the vertical cylindrical cavity of the cage;
  at least one detachable covering means to enclose the shut off valve provided with the flow control means;
  locking means to lock the cylindrical shut off valve, while allowing said shut off valve to remain rotatable, with the cage, and to also limit the rotation of the cylindrical shut off valve with respect to the cage;
  sealing means to seal the fluid exit from the valve.

2. A flow control and pressure reducing valve according to claim 1, wherein the flow control means, to control fluid through said openings that are passage means, are hat shaped elastomeric diaphragms seated on said two opposite seats, whereby they control fluid flow from the inlet chamber of the cylindrical valve to the outlet chamber of the cylindrical valve.

3. A flow control and pressure reducing valve according to claim 1, wherein the means to supply pressurized fluid to said control means are needle and pilot control valves located outside the valve.

4. A flow control and pressure reducing valve according to claim 1, wherein the drive means to rotate said cylindrical shut off valve is a shaft connected to the shut off valve through intermediate radial means, having an integral circular fringe that is provided with means to connect said fringe to the shut off valve.

5. A flow control and pressure reducing valve according to claim 1, wherein the partitioning means is a flat plate that divides the cylindrical shut off valve into two equal parts, and creates an inlet chamber to receive fluid from the inlet opening of the cage and an outlet chamber to discharge fluid to the outlet opening of the cage.

6. A fluid control, pressure reducing valve, comprising:
  a cylindrical cage, open on both ends, having at least one inlet opening to receive fluid from the upstream pipe of the pipeline, and one outlet opening to discharge fluid to the downstream pipe of the pipeline, and said cage configured to receive a rotatable cylindrical shut off valve in said cage's inner cylindrical cavity, whith the cylindrical shut off valve having the same number of correspond matching openings as whatever the cage has, and with said cylindrical shut off valve having two opposite seats with equal and evenly distributed plurality of openings that are passage means for the passage of fluid, and said seats are connected with a partitioning means to create an inlet chamber to receive fluid from the inlet opening of the cage and an outlet chamber to discharge fluid to the outlet opening of the cage;
  flow control means, responsive to pressurized fluid, located on said seats to block and to control fluid flow through said passage means for the passage of fluid;
  means to supply pressurized fluid to said flow control means for controllably restricting each of said passage means to thereby control flow of fluid through the valve;
  drive means to rotate, with respect to the cage, said cylindrical shut off valve received in the vertical cylindrical cavity of the cage;
  at least one detachable covering means to enclose the shut off valve provided with the flow control means;

locking means to lock the cylindrical shut off valve, while allowing said shut off valve to remain rotatable, with respect to the cage, and to also limit the rotation of the cylindrical shut off valve within the cage;

sealing means to seal the fluid exit from the valve.

7. A flow control and pressure reducing valve according to claim 6, wherein the flow control means to control fluid through said openings that are passage means for the passage of fluid, are pistons seated on said two opposite seats, whereby they control fluid flow from the inlet chamber of the cylindrical valve to the outlet chamber of the cylindrical valve.

8. A flow control and pressure reducing valve according to claim 6, wherein the means to supply pressurized fluid to said control means are needle and pilot control valves located outside the valve.

9. A flow control and pressure reducing valve according to claim 6, wherein the drive means to rotate said cylindrical shut off valve is a shaft connected to the shut off valve through intermediate radial means, having an integral circular fringe that is provided with means to connect, said fringe to the shut off valve.

10. A flow control and pressure reducing valve according to claim 6, wherein the partitioning means is a concentric cylinder open on both sides inside the cylindrical shut off valve, integrally connected to said two seats and connected also to the cylindrical wall of the shut off valve by means of a reducer pipe.

11. A fluid control, pressure reducing valve, comprising:
a cylindrical cage, having at least one inlet opening to receive fluid from the upstream pipe of the pipeline, and one outlet opening to discharge fluid to the downstream pipe of the pipeline, and said cage configured to receive a rotatable cylindrical shut off valve in said cage's inner cylindrical cavity, whith the cylindrical shut off valve having the same number of correspond matching openings as whatever the cage has, and with said cylindrical shut off valve having two opposite seats with equal and evenly distributed plurality of openings that are passage means for the passage of fluid, and said seats are connected with a partitioning means to create an inlet chamber to receive fluid from the inlet of the cage and an outlet chamber to discharge fluid to the outlet opening of the cage;

flow control means, responsive to pressurized fluid, located on said seats to block and to control fluid flow through said passage means for the passage of fluid;

means to supply pressurized fluid to said flow control means for controllably restricting each of said passage means to thereby control the flow of fluid through the valve;

drive means to rotate, with respect to the cage, said cylindrical shut off valve received in the vertical cylindrical cavity of the cage;

at least one detachable covering means to enclose the shut off valve provided with the flow control means;

locking means to lock the cylindrical shut off valve, while allowing said shut off valve to remain rotatable, within the cage, and to also limit the rotation of the cylindrical shut off valve with respect to the cage;

sealing means to seal the fluid exit from the valve.

12. A flow control and pressure reducing valve according to claim 11, wherein flow the control means to control fluid through the openings that are passage means, are hat shaped elastomeric diaphragms seated on said two opposite seats, whereby they control fluid flow from the inlet chamber of the cylindrical valve to the outlet chamber of the cylindrical valve.

13. A flow control and pressure reducing valve according to claim 11, wherein the means to supply pressurized fluid to said control means are needle and pilot control valves located outside the valve.

14. A flow control and pressure reducing valve according to claim 11, wherein the drive means to rotate said cylindrical shut off valve is a shaft connected to the shut off valve through intermediate radial means, having an integral circular fringe that is provided with means to connect said fringe to the shut off valve.

15. A flow control and pressure reducing valve according to claim 11, wherein the piped partitioning means is a pipe held integrally in place in the cylindrical shut off valve between two opposite seats provided for the elastomeric diaphragms and said pipe's two ends are integrally held to the cylindrical wall of said shut of valve.

16. A flow control and pressure reducing valve according to claim 1, wherein the primary seal is a tubular pipe seal having corresponding matching openings with the openings in the cylindrical cavity of the cage and in the wall of the cylindrical shut off valve to seal the flow of fluid between the two.

17. A flow control and pressure reducing valve according to claim 11, wherein a seal, having corresponding openings preferably matching the openings in the inlet and outlet openings of the cage and also corresponding to the openings in the wall of the cylindrical shut off valve, to seal the flow of fluid between the cage and the cylindrical shut off valve, is a reducer seal in the reducer inlet and outlet of the cage.

18. A flow control and pressure reducing valve according to claim 1, where said locking means to lock the cylindrical shut off valve to the cage and to also limit the rotation of the cylindrical shut off valve in the cage with respect to the central cavity of the cage, are wedge bearings and bolt bearings used in combination, or with the wedge bearings used on one end of the valve while the bolt bearings are used on the other end of the valve.

19. A flow control and pressure reducing valve according to claim 6, where said locking means to lock the cylindrical shut off valve to the cage and to also limit the rotation of the cylindrical shut off valve in the cage with respect to the central cavity of the cage, are wedge bearings and bolt bearings used in combination, or with the wedge bearings used on one end of the valve while the bolt bearings are used on the other end of the valve.

20. A flow control and pressure reducing valve according to claim 11, where said locking means to lock the cylindrical shut off valve to the cage and to also limit the rotation of the cylindrical shut off valve in the cage with respect to the central cavity of the cage, are wedge bearings and bolt bearings used in combination, or with the wedge bearings used on one end of the valve while the bolt bearings are used on the other end of the valve.

* * * * *